US010768320B2

(12) United States Patent
Bloser et al.

(10) Patent No.: US 10,768,320 B2
(45) Date of Patent: Sep. 8, 2020

(54) FIELD DEPLOYABLE NEUTRON/GAMMA SPECTROMETER

(71) Applicant: University of New Hampshire, Durham, NH (US)

(72) Inventors: Peter F. Bloser, Portsmouth, NH (US); Jason Legere, Sandford, ME (US); Christopher M. Bancroft, Sanbornville, NH (US)

(*) Notice: Subject to any disclaimer, the term of this patent is extended or adjusted under 35 U.S.C. 154(b) by 154 days.

(21) Appl. No.: 15/977,616

(22) Filed: May 11, 2018

(65) Prior Publication Data

US 2018/0329089 A1  Nov. 15, 2018

Related U.S. Application Data

(60) Provisional application No. 62/504,739, filed on May 11, 2017.

(51) Int. Cl.
  *G01T 3/06* (2006.01)
  *G01T 1/20* (2006.01)
  *G01T 1/29* (2006.01)

(52) U.S. Cl.
  CPC .............. *G01T 3/06* (2013.01); *G01T 1/2008* (2013.01); *G01T 1/29* (2013.01)

(58) Field of Classification Search
  CPC ............ G01T 3/06; G01T 1/29; G01T 1/2008
  See application file for complete search history.

(56) References Cited

U.S. PATENT DOCUMENTS

| 3,832,545 A | 8/1974 | Bartko |
| 4,415,808 A | 11/1983 | Cusano et al. |
| 5,446,288 A | 8/1995 | Tumer |
| 7,468,516 B2 | 12/2008 | Smither |
| 7,514,694 B2 | 4/2009 | Stephan et al. |

(Continued)

FOREIGN PATENT DOCUMENTS

| JP | S486831 | 2/1973 |
| JP | S6249282 | 3/1987 |

(Continued)

OTHER PUBLICATIONS

Nishitani et al., "Development of Neutron Detector with the Digital Signal Processing Technique," Eleventh Meeting of the ITPA Topical Group on Diagnostics, Sep. 8, 2006, pp. 1-17.

(Continued)

*Primary Examiner* — David P Porta
*Assistant Examiner* — Meenakshi S Sahu
(74) *Attorney, Agent, or Firm* — Finch & Maloney PLLC

(57) ABSTRACT

A system of the present disclosure is capable of detecting, imaging and measuring both neutrons and gamma rays. The system may be portable and/or field deployable. The system may include two or more detector layer cases and a digital processing unit case. The system has a plurality of parallel plates each containing a plurality of detectors. The plates may have non-PSD organic scintillation detectors, scintillation detectors having pulse-shape discrimination (PSD) properties, and inorganic scintillation detectors. A first plate and a second plate are housed within detector layer cases. The scintillation detectors are used in connection to detect, image and measure neutrons and/or gamma rays.

20 Claims, 23 Drawing Sheets

(56) References Cited

U.S. PATENT DOCUMENTS

| | | |
|---|---|---|
| 7,741,613 B1 | 6/2010 | Mascarenhas et al. |
| 7,772,558 B1 | 8/2010 | Nagarkar et al. |
| 8,030,617 B2 | 10/2011 | Enghardt et al. |
| 8,207,507 B2 | 6/2012 | Zaitseva et al. |
| 8,248,601 B2 | 8/2012 | Corbeil et al. |
| 8,710,450 B2 | 4/2014 | Ryan |
| 8,829,443 B2 | 9/2014 | Ryan et al. |
| 9,052,399 B2 | 6/2015 | Perna |
| 9,507,035 B2 | 11/2016 | Ryan et al. |
| 2004/0251420 A1 | 12/2004 | Sun |
| 2007/0080297 A1* | 4/2007 | Clarke .................. G01T 1/167 250/366 |
| 2007/0272874 A1* | 11/2007 | Grodzins .............. G01T 1/2018 250/390.11 |

FOREIGN PATENT DOCUMENTS

| | | |
|---|---|---|
| JP | 2008-026195 | 2/2008 |
| JP | 2008-045948 | 2/2008 |
| JP | 5341047 | 4/2012 |
| WO | 20040109331 | 12/2004 |

OTHER PUBLICATIONS

Partial Supplementary European Search Report, received in European Patent Application No. 1183854.6, dated Jul. 6, 2015, 7 pages.

Extended European Search Report, received in European Patent Application No. 1183854.6, dated Oct. 23, 2015, 10 pages.

Office Action received in Japanese Patent Application No. 2013-537655, dated Jun. 30, 2015, 3 pages.

Madden et al., "An Imaging Neutron/Gamma-Ray Spectrometer," Proc. SPIE 8710, Chemical, Biological, Radiological, Nuclear, and Explosives (CBRNE) Sensing XIV, 87101L, May 29, 2013, 14 pages.

Ryan et al., "An Imaging Neutron/Gamma-Ray Spectrometer," Proc. SPIE 8509, Penetrating Radiation Systems Applications XIII, 850905, Oct. 19, 2012, 13 pages.

Ryan, James, "NSPECT—A Portable Imaging Neutron Spectrometer," Univ. of New Hampshire, 2011, 1 page.

\* cited by examiner

Top view

Side view with
outer cylindrical housing
removed

US 10,768,320 B2

FIELD DEPLOYABLE NEUTRON/GAMMA SPECTROMETER

CROSS-REFERENCE TO RELATED APPLICATIONS

This application claims benefit under 35 U.S.C. § 119(e) to U.S. Provisional Patent Application No. 62/504,739, filed on May 11, 2017, which is hereby incorporated by reference herein in its entirety.

STATEMENT REGARDING FEDERALLY SPONSORED RESEARCH OR DEVELOPMENT

This invention was made with government support under Defense Threat Reduction Agency contract HDTRA1-15-C-0027. The government has certain rights in the invention.

TECHNICAL FIELD

This disclosure generally relates to radioactive material detectors and, in particular, to spectrometers that can remotely detect sources of neutrons and gamma rays.

BACKGROUND

There are several applications for conventional neutron imager/spectrometers. However, most applications revolve around detecting, locating, monitoring, and identifying nuclear material. Neutrons are, by their nature, resistant to detection, and defy easy imaging and spectroscopy. Detection techniques have mostly been in the form of registering moderated or thermalized neutrons from a fast neutron source. Because these techniques measure the charged particles produced by a neutron interaction, deducing the properties of the parent neutron is ambiguous, besides being difficult.

In one application, registering moderated neutrons comes without any information about the incident direction or energy. Measuring fast neutrons in a bulk detector provides an energy measurement, but lacks directional information. A double-scatter telescope pays the penalties of greatly increased complexity and low efficiency by requiring two neutron scatters, but benefits because the elastic scatter kinematics can be used to constrain the incident velocity vector while simultaneously performing a quality energy measurement.

SUMMARY

The system described herein is configured to detect, image, and measure both neutrons and gamma rays. In some embodiments, this system is configured to be portable and field deployable to a location of interest for detection of neutrons and/or gamma rays. In certain embodiments, the system has a plurality of parallel plates each containing a plurality of detectors. Each plate may have the same or different collection of detectors. In certain embodiments, the system has a plurality of scintillation detectors of uniform size that are distributed about an area. In certain embodiments, the first plate and/or the second plate may use scintillation detectors having pulse shape discrimination (PSD) properties. In certain embodiments, the first plate and/or the second plate may use non-PSD organic scintillation detectors. In certain embodiments, the first plate and/or the second plate may use inorganic scintillation detectors. In certain embodiments, a first plate and a second plate are used in concert to detect, image, and measure neutrons and/or gammas. Alternatively, rods may be used instead of plates and may be arranged in a frame.

Accordingly, pursuant to one aspect, there is contemplated a system for imaging and measuring neutrons and gamma rays, the system comprising two or more detector layer cases, a plurality of plates, having at least a first plate and a second plate, which plates are parallel to each other, and an electronic and processing unit, wherein the first plate and the second plate each carry a plurality of scintillation detectors, wherein each of the first plate and the second plate are contained within one of the two or more detector layer cases, wherein the plurality of scintillation detectors are electronically connected to the electronic and processing unit, and wherein the plurality of scintillation detectors detect a neutron and/or a gamma ray and the electronic and processing unit determines the path of the neutron and/or gamma ray based on an interaction with one of the plurality of scintillation detectors on the first plate and an interaction with one of the plurality of scintillation detectors on the second plate.

The system may be further characterized by one or any combination of the features described herein, such as the plurality of scintillation detectors are formed from stilbene, the plurality of scintillation detectors are a combination of non-pulse shape discrimination organic scintillators, inorganic scintillators, and scintillators that possess pulse shape discrimination properties, the scintillators that possess PSD properties use stilbene, the inorganic scintillators use NaI, the non-PSD organic scintillators are plastic, the system is configured to localize sources of MeV neutrons and gamma rays within ±3°, the system is configured to localize sources of MeV neutrons and gamma rays with an angular resolution of about 15°, the system is configured to use greater than 20 intersecting cones to localize sources of MeV neutrons and gamma rays, the system is configured to operate with voltages below 35 volts, the plurality of scintillation detectors are configured for detection of neutrons in the energy range of between about 1 MeV to about 20 MeV, the plurality of scintillation detectors are configured for detection of gamma rays of between about 0.3 MeV and about 10 MeV, the plurality of scintillation detectors are arranged in a matrix configuration, and the matrix is a 6×6 matrix.

Pursuant to another aspect, there is contemplated a kit of parts for detecting neutrons and gamma rays comprising two or more portable cases, a plurality of plates, having at least a first plate and a second plate, wherein the first plate and the second plate each carry a plurality of scintillation detectors, at least one camera, an electronic and processing unit, and a remote computer, the remote computer comprising a display panel for displaying detection results.

Pursuant to another aspect, there is contemplated a method of imaging and measuring neutrons and gamma rays comprising providing a plurality of plates, the plurality of plates being held within two or more portable, field deployable cases, the plurality of plates having at least a first plate and a second plate, transporting the portable, field deployable cases to a target location, detecting a particle by its interaction with the scintillation detectors of the first plate, measuring the time of flight of the particle from the scintillation detectors on the first plate to the scintillation detectors on the second plate, determining details regarding the particle based on interaction of the particle with the scintillation detectors on the second plate, including a pulse shape measurement generated by pulse shape discrimination (PSD) property of the detectors, detecting the particle by its interaction with the inorganic scintillation detectors of the first plate, and analyzing data to determine if the particle is a neutron or a gamma ray.

The method may be further characterized by one or any combination of the features described herein, such as the scintillation detectors include non-PSD organic scintillation detectors, inorganic scintillation detectors, and scintillation detectors that possess PSD properties, a signal to noise ratio is maximized for both the neutron and gamma ray detection based on the pulse shape measurement, the inorganic scintillation detectors use NaI, and the non-PSD organic scintillation detectors are plastic and the scintillation detectors that possess PSD properties use stilbene.

Pursuant to another aspect, there is contemplated a method of imaging and measuring neutrons and gamma rays comprising providing an electronic and processing unit; providing a plurality of scintillation detectors of uniform length and width that are distributed in a matrix, the plurality of plates being held within two or more portable, field deployable cases, wherein the detectors are electronically connected to the electronic and processing unit, wherein the plurality of scintillation detectors comprise non-PSD organic scintillators, inorganic scintillators and scintillators that possess PSD properties, detecting a particle by its interaction with the non-PSD organic scintillators, measuring the time of flight of the particle from the non-PSD scintillators to the scintillators that possess PSD properties, determining details regarding the particle based on interaction of the particle with the scintillators that possess PSD properties, including a pulse shape measurement generated by pulse-shape-discrimination (PSD) property of the scintillators, detecting the particle by its interaction with the inorganic scintillators; and analyzing data to determine if the particle is a neutron or a gamma ray.

The method may be further characterized by one or any combination of the features described herein, such as a signal to noise ratio is maximized for both the neutron and gamma ray detection based on the pulse shape measurement, the inorganic scintillators use NaI, the non-PSD organic scintillators are plastic, and the scintillators that possess PSD properties use stilbene, the non-PSD organic scintillators, the inorganic scintillators and the scintillators that possess PSI) properties are grouped in trios.

These aspects are not meant to be exclusive and other features, aspects, and advantages of the embodiments disclosed herein will be readily apparent to those of ordinary skill in the art when read in conjunction with the following description, appended claims and accompanying drawings. Further aspects, advantages and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The foregoing and other objects, features, and advantages of the disclosure will be apparent from the following description of particular embodiments, as illustrated in the accompanying drawings in which like reference characters refer to the same parts throughout the different views. The drawings are not necessarily to scale, emphasis instead being placed upon illustrating the principles of the disclosure.

DETAILED DESCRIPTION

Figure 1:
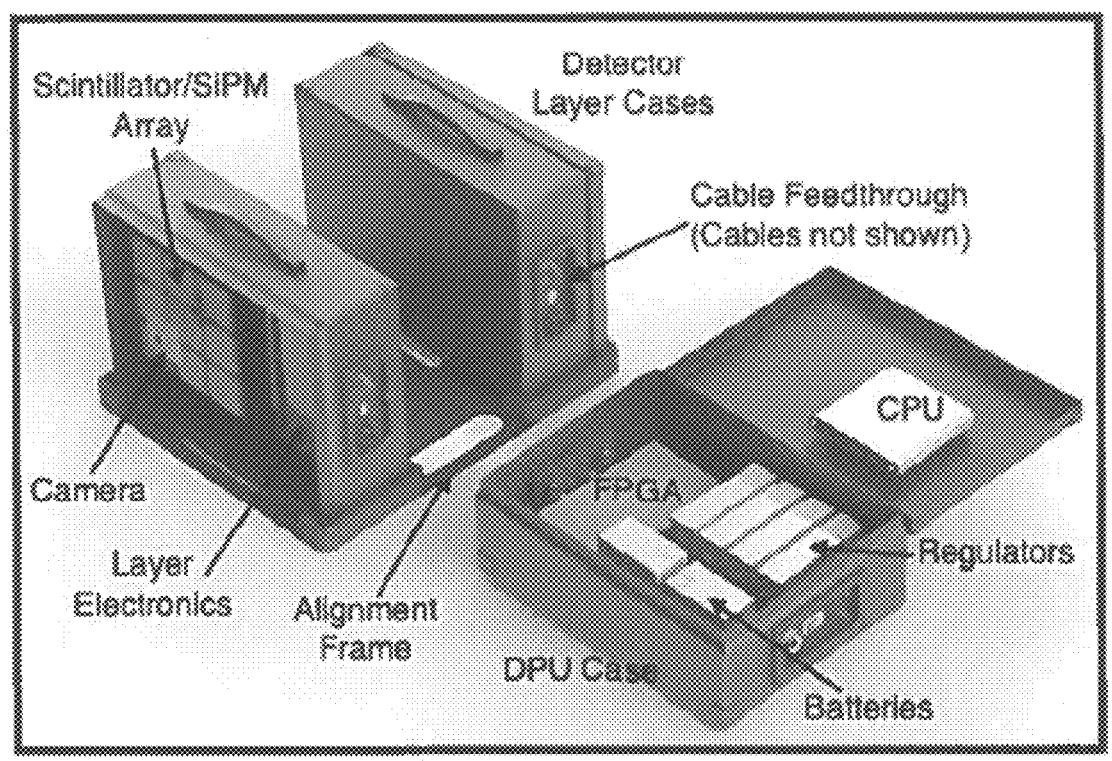
FIG. 1 is a perspective view of a three case system of one embodiment an imaging neutron/gamma spectrometer system.

The following description is merely exemplary in nature and is not intended to limit the present disclosure, application, or uses.

As will be seen, the devices and methods taught herein offer a portable, field deployable, and easily transportable neutron and gamma ray detection mechanism. The present disclosure describes a system configured to detect neutrons and gamma rays. Neutron detection is the effective detection of neutrons entering a well-positioned detector. Most radioactive sources produce gamma rays, which are of various energies and intensities. In some embodiments, when gamma rays are produced, such as from a radioactive source, a spectroscopy system detects and analyzes these emissions and a gamma-ray energy spectrum can be produced. Analysis of this spectrum is typically used to determine the identity and quantity of gamma emitters present in a gamma source. The resulting spectrum is characteristic of the material contained in a sample.

It may be desirable to provide a system configured for neutron and gamma ray detection, including detection of fissile materials which can be masked or hidden in innocuous materials. For example, in previous non-imaging approaches to detection, the presence of nuclear material cannot be identified over quantities of otherwise naturally radioactive innocuous materials or background materials. Examples of such shielding by background radiation include the natural thorium found in granite, large shipping crates of bananas, or kitty litter.

The present disclosure provides a solution, through the various embodiments described herein, for identification of potentially dangerous quantities of fissile material, even in the presence of materials that might otherwise mask detection. The system and methods disclosed herein further provide for imaging of neutrons that cannot be shielded with lead or other materials typically used to confine radioactive emissions for safety or, alternatively, for covert operations. The system and methods described herein provide for detection as well as localization of neutrons and gamma rays using a compact portable system.

In various measurement systems, it may be desirable to measure the shape of an incident signal. Measurement can be achieved using scintillator materials, such as stilbene and other plastic materials, which permit identifying the nature of the event as a gamma ray (a photon event) or a neutron or other heavy particle. With suitable accuracy and resolution, the detection system may be configured to do low AMU mass spectrometry without extensive hardware. Numerous approaches may be taken to accomplish this such as, for example, differential integrations, complex slope filtering, and high-speed total event digitization and analysis and Fast Fourier Transform (FFT) analysis. Achieving successful measurements at low energy levels it not easily achieved, however. Previous approaches have used a part of the total signal and are performance limited as a result.

The present disclosure provides an approach configured to take measurements using all the event energy with less complex hardware in order to provide successful identification for a wide dynamic range, including at levels close to a detection limit of the detector. The present disclosure provides a system configured to collect a number of parameters regarding the detection event, including peak amplitude, integrated energy, and PSD. The present disclosure provides a system configured to achieve low noise measurements. The mode of detection eliminates some challenges of commercial units, including rise time and cable termination sensitivity.

In the present disclosure, to perform imaging, art incident neutron undergoes a neutron-proton (n-p) scatter in each of two detectors. One must be able to follow the path of the neutron once it enters the instrument, measuring the location, relative time, and energy deposits of each n-p interaction. In the case of gamma rays, the same technique applies, but Compton-scatter electrons are used instead of protons.

In some embodiments, there are at least two components used to effectively detect neutrons and gamma rays. These components may include hardware components and/or software components. Detection hardware includes, for example, scintillation detectors and electronics used in the detection setup. Further, the hardware setup also defines experimental parameters, such as source-detector distance, solid angle and detector shielding. Detection software includes analysis tools that perform tasks such as graphical analysis to measure the number and energies of neutrons striking the detector.

In some embodiments, the spectrometer is designed to be portable as described below in more detail. For instance, in one embodiment illustrated in FIGS. 1-2, two parallel plates or planes 21 and 22 are housed within one or more cases which may be of a length, width, height, and weight such that the one or more cases may be portable. The one or more cases may be portable in a backpack configuration, portable as one or more cases with a single handle, portable by one or more people with minimal required effort, or transportable by other means to a position within a distance from a suspected target. The field deployable system described herein is configured to be easy to transport and set up at a target location. It is contemplated that the system including two detector layer cases and a digital processing unit case would take approximately 5 minutes to set up at a target location. A detector layer case may be defined, for example, as a portable case containing at least a single layer of scintillation detectors.

Figure 4:
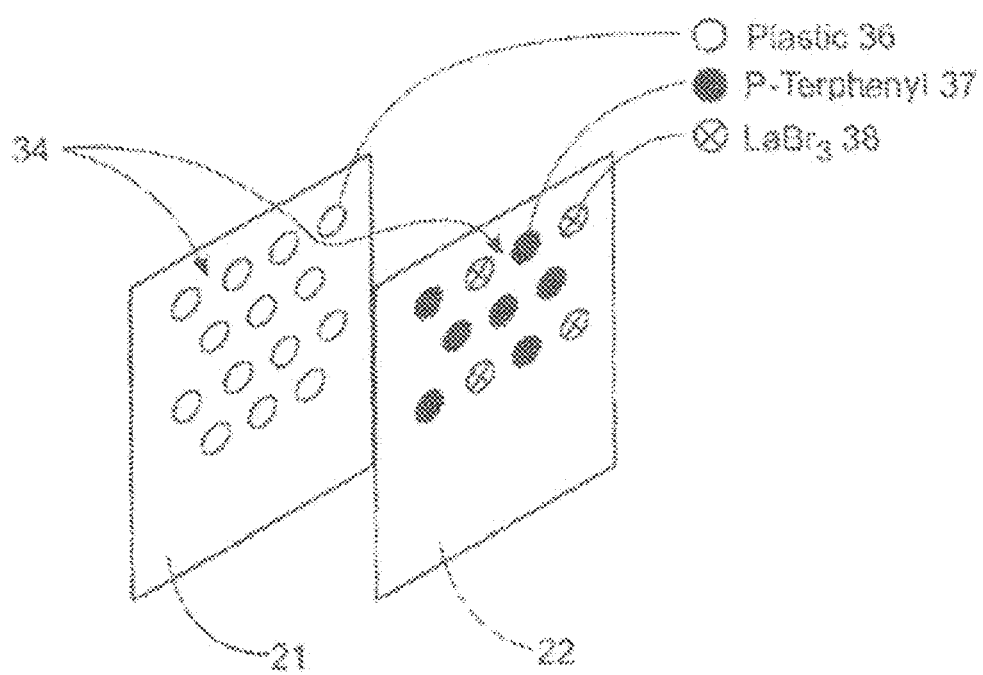
FIG. 4 is a schematic view of one embodiment of an imaging neutron/gamma spectrometer system.

Referring to FIG. 4, components of an imaging neutron/gamma spectrometer are shown. Using these components, the spectrometer is capable of imaging and measuring both neutron and gamma sources remotely. The spectrometer performs remote imaging and measuring without touching the source. More particularly, in one embodiment, the spectrometer has a frame, not shown, and two parallel detecting plates or planes 21 and 22, and an electronic and processing unit, which is not shown.

The system described herein may be configured to perform of stand-off imaging. Stand-off imaging may be defined, for example, to mean imaging a target from a given distance. The field deployable system described herein is capable of detecting neutrons and/or gamma rays from a distance of between 5 and 100 m. Larger distances may require longer dwell times. For example, a target between 15 and 30 m away may require a dwell time of about 20 to 30 minutes. A target between 10 and 15 m away may require a dwell time of between 5 and 10 minutes.

In certain embodiments of the present disclosure, as shown for example in FIGS. 1, 2, 3A, and 4, the detecting plates or planes 21 and 22 are parallel to each other. Each panel has a plurality of detectors 34. Each detector 34 is a scintillation detector. A scintillation detector 34 produces a flash of light (scintillation) in a fluorescent material by an ionizing radiation, which is detected and counted by a multiplier phototube or other light sensor and associated circuits in the electronic and processing unit. Each of the detecting plates 21 and 22 has detectors 34 which can be the same or different from those of the same plate or of the other plates.

Figure 5:
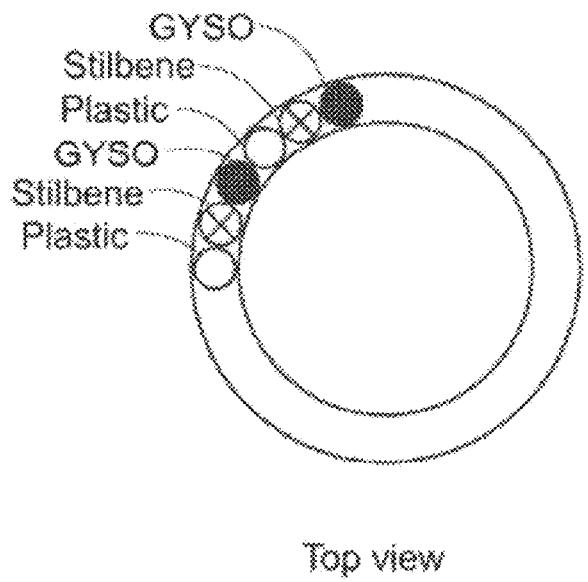
FIG. 5 is a schematic view of one embodiment of an imaging neutron/gamma spectrometer system.
Figure 5:
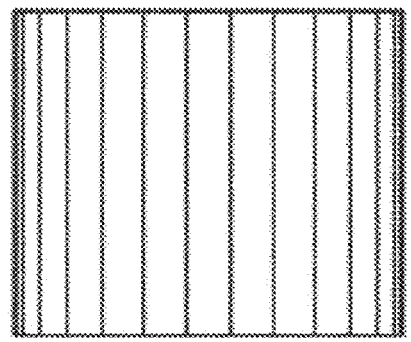
Figure 6:
FIG. 6 is a perspective view of an example display panel integratable with the neutron/gamma spectrometer system.

Many forms of scintillators may be used in the neutron/gamma detector in accordance with the embodiments disclosed herein. For simplicity, the examples listed herein may refer to three general forms of scintillators, including non-PSD organic scintillators, scintillators that possess PSD properties (organic or inorganic), and inorganic scintillators. In certain embodiments, the organic scintillators may include, but are not limited to plastic, liquid, or crystalline. In certain embodiments, the scintillators that possess PSD properties may include, but are not limited to organic scintillators. In certain embodiments, the scintillators that possess PSD properties may include, but are not limited to stilbene, p-terphenyl, and/or other liquid scintillators. In certain embodiments, the inorganic scintillators may include, but are not limited to sodium iodide, bismuth germinate (BGO), LYSO ($LuI_{0.8}Y_{0.2}SiO_5(Ce)$), YAG(Ce) yttrium aluminum garnet, lanthanum bromide (LaBr3) or other rare-earth halides. Many types of organic and inorganic scintillators could be utilized depending on the application, and cost, mass and size constraints. In some embodiments, the scintillation detectors are non-$^3$He detectors. In some embodiments, the system described herein may be configured using all organic scintillators (e.g., plastic and/or stilbene). In some embodiments, the system described herein may be configured using a combination of denser inorganic scintillators (i.e. LaBr3 or GYSO as shown in FIGS. 4-5), in which case the system would be better configured for gamma ray detection. Choice of scintillation detector may affect dwell time. In some embodiments, dwell time is the required time for the system to remain in the same position in order to achieve detection of neutrons or gamma rays.

In one embodiment, the two plates 21 and 22 form a stack in which MeV-range nuclear neutron and gamma radiation can be detected. The system and method described herein is configured for detection of neutrons in the energy range of between about 1 MeV to about 20 MeV. The system and method described herein is configured for detection of gamma rays in the energy range of between about 0.3 MeV and about 10 MeV. The system and method described herein are designed for detection using a low detection threshold. In some embodiments, the detectors 34 of the first plate 21 and second plate 22 may have a non-PSD organic scintillator that acts as part of the neutron imaging system and to a lesser degree the gamma imaging system. The detectors 34 of the first plate 21 and the second plate 22 also employ a scintillator that possesses pulse shape discrimination (PSD) properties. The detectors 34 may be PSD-capable detectors 56 or non-PSD-capable detectors 54. In certain embodiments, neutrons are scattered first in the first plate 21 by the non-PSD organic scintillation detectors 54 and then further scattered in the second plate 22 by the PSD-capable detectors 56 in a double-scatter arrangement. The PSD signal from the scintillator is used preferentially to select either neutron interactions or gamma interactions.

In contrast to two plate arrangements which utilize one detector type, the PSD-capable detectors 56 of the second plate 22 and non-PSD-capable detectors 54 of the first plate 21, allow the system to be used also for gamma imaging. In certain embodiments, the gamma imaging uses the second plate 22, with the PSD-capable detectors 56, and the first plate 21, where the detectors 34 of the first plate 21 and the second plate 22 have inorganic scintillators. In one embodiment, the inorganic detectors use sodium iodide (NaI). In one embodiment, the detectors having PSD properties use stilbene. In one embodiment, the (non-PSD) organic detectors are scintillating plastic. Although an organic PSD scintillator such as stilbene can be used in both the first and second plates, use of plastic scintillators is less expensive and may have certain advantages over stilbene in locations where PSD is not required. For example, using a plastic scintillator may be lower cost and more rugged.

In certain embodiments, the second plate 22 or the first plate 21 comprise PSD-capable detectors. A component of the gamma imaging system provides the necessary PSD measurement to maximize signal to noise for both detection systems. By having an array of various detectors in each plane, the detector can function in either direction for a variety of radiation sources. For example, in one embodiment, the PSD-capable detectors 56 of the second plate 22 are shared by the gamma and neutron imaging systems.

Certain embodiments of the system are designed with some of the material in the detectors 34 of the first plane 21 and second plane 22 being plastic scintillators with no pulse shape discrimination properties. Certain embodiments of the system are designed with some of the material in the detectors 34 of the first plane 21 and the second plane 22 being comprised of an organic crystal, called stilbene, or some other material that possesses pulse shape discrimination properties. Certain embodiments of the system are designed with some of the material in the detectors 34 of the first plane 21 and the second plane 22 being comprised of an inorganic crystal, such as NaI, or the like, that does not possess PSD.

Stilbene, or other material with PSD properties, provides the neutron/gamma identification to maximize the signal to noise ratio for both systems. In certain embodiments, the system uses solid scintillators in contrast to liquid scintillators such as a mineral-oil based scintillator. Generally, the solid scintillators allow for a more rugged portable system, as shown for example in FIGS. 1-2, 6, and 9. Solid scintillation detectors such as stilbene can be manufactured as a cube shape or as a rectangular prism. Such scintillator configurations may be easy to stack and arrange in a compact form and therefore, in one embodiment, may be ideal for use in a field deployable neutron and gamma ray detection system. Stilbene in particular allows neutrons to scatter off of hydrogen and is capable of providing bright light output. Use of stilbene as a scintillation detector may provide a lower detection threshold (1 MeV for neutrons) and reduce dwell time by about 10 times. Use of stilbene as a scintillation detection may provide a larger number of counts from a source of a given strength at a given distance. Use of stilbene as a scintillation detector may provide good signal and help to improve data processing speeds.

The field deployable system described herein provides a sturdy, rugged, easily movable means for detection of fast neutrons and gamma rays. In certain embodiments, the detector cell plates are sprung to absorb shock during transit. In one embodiment, shown in FIGS. 1-2, two detector layer cases are mounted on an alignment frame base. In other embodiments, a plurality of detector layer cases may be stacked and mounted on an alignment frame base. As more detector layer cases that are added into the detection system, the following advantages may be realized: stronger signal, reduced dwell time, larger number of counts, and increased detection distance. In one embodiment, a plurality of scintillation detectors of uniform length and width are distributed in a matrix (see, for example, FIG. 9). It is contemplated that the matrix may be anywhere from a 2×2 matrix up to a 10×10 matrix. Larger matrix sizes are also contemplated but may be heavier and thus provide challenges for a portable unit. Increased matrix size may allow the following advantages to be realized: stronger signal, reduced dwell time, larger number of counts, and increased detection distance.

In either case, increased numbers of detector layer cases or increased matrix size, the result is increased detector area, and therefore increased detection effectiveness, which yields more counts in a given time from a given source at a given distance.

As indicated above, the two parallel detecting plates 21 and 22 each have a plurality of detectors 34. Plastic detectors 36, p-terphenyl detectors 37, and LaBr3 detectors 38 may be used throughout the plates. The order of detectors 36, 37, and 38 is not critical and they include, for example, non-PSD organic scintillators, scintillators having PSD properties (either organic or inorganic), and inorganic scintillators.

The actual neutron measurements employ the scintillation amplitude in the non-PSD organic scintillators and the time-of-flight from the non-PSD organic to the PSD capable detectors. A gamma signal in the PSD-capable detector can be used to reject gamma events. The gamma measurements use the scintillation amplitude in both the PSD-capable detector 56 and the inorganic scintillators with the time-of-flight used to reject neutrons. A neutron signal in the PSD-capable detector 56 would be required to accept an event. An event occurs when there is a signal in the two detecting planes.

As indicated above, the system is capable of measuring both neutrons and gamma rays. The neutron and gamma emissions are related and can be used together for increased knowledge of the source of radiation environment. The first plate 21 and/or the second plate 22 act as a double scatter camera for the neutrons and gamma emissions. The second plate 22 and the first plate 21 act as a double scatter camera for the gamma emissions and the neutrons from the other direction. Whether it be a neutron or a gamma ray, the idea is that a particle scatters once in a forward detector volume after which it subsequently interacts with a rearward detector volume a short distance away. A neutron or a gamma can pass through any of these detectors 34 without any interaction. These particles interact in a probabilistic fashion. The thickness of these detectors is selected to be thick enough to register a reasonable fraction of particles, but not so thick that they interact twice. It is contemplated that detector thickness can be in the range of 1 cm to 15 cm. In one embodiment, the detector thickness is approximately 5.5 cm.

The ideal scattering or detection medium for neutrons, the detectors 34 in the first plate 21 and the second plate 22, also happen to be an excellent forward scatterer for gamma rays. Such a material is an organic substance rich in hydrogen. Thus, for a neutron camera, one constructs the camera with an organic scintillator for both the forward and rearward scatterers. The neutron energy is measured by summing the energy the neutron deposits in the forward detector and the energy of the recoiling neutron measured by the travel time to the rearward detector.

The situation for gamma rays is different in that all gamma rays travel with the same speed, so that no energy information is gleaned from time-of-flight. Instead, in one embodiment, one must capture the gamma ray in entirety, requiring a thick detector, typically made of a dense inorganic scintillator, such as is found in the detectors in the first plate 21 and second plate 22. The hydrogen content of a gamma-ray detector is not important. However, it must just be thicker than the interaction length of the gamma ray in that medium.

In one embodiment, the neutron scatter process starts with a scatter in an organic scintillator and then another scatter in a different organic scintillator. One of these scintillators should have PSD properties. The gamma scatter process begins with a scatter in an organic scintillator, followed by a scatter in an inorganic scintillator. It is best if the organic scintillator has PSD properties. The physical arrangement of the organic (PSD and non-PSD) and the inorganic scintillators is not fixed. Even intermingling scintillator types is allowed, provided the scintillator signals are processed by the appropriate electronics. Scintillator arrangements need not be rectilinear or planar.

In certain embodiments, the neutron scatter camera of the system has a plurality of plates, having at least a first plate and a second plate with non-PSD organic scintillation detectors. In certain embodiments, the gamma ray detection camera has an inorganic scintillation detector 34. Either plate with the scintillator having PSD properties can serve as the rearward scatterer for the neutron camera and the forward scatterer for the gamma camera, thereby providing a dual species camera.

While a neutron camera comprised of all organic scintillation detectors can detect gamma rays, it is done with compromised quality. Similarly, a traditional gamma camera can detect neutrons but inefficiently and with compromised resolution.

The detectors 34, in one embodiment, use solid organics such as plastic and stilbene in the two plates instead of a liquid such as a mineral-oil based scintillator. This is because fieldwork requires added ruggedness. Solid organics also provide pulse shape discrimination (PSD), meaning that the nanosecond shape of the signal from the detectors can be used to identify whether the scattering particle is a gamma ray or a neutron. It is beneficial to have plates comprised of scintillation detectors with this property.

The complete system has optimized sensitivity for both species of particles, while minimizing the total amount of hardware and the electronics. In certain embodiments, having all scintillators in the solid state can make the detector rugged while still possessing excellent resolution and sensitivity for both species. The system described herein is configured to achieve energy resolution for neutrons of about 25% (FWHM). The system described herein is configured to achieve energy resolution for gamma rays of about 50% (FWHM), a result of using organic detectors for gamma rays.

Neutrons have no charge, and therefore do not readily interact. Thus, neutrons must be detected by indirect methods. A method for neutron detection at MeV energies exploits the large elastic n-p scattering cross section. One material that can be used, which serves the functions of neutron scatterer and recoil proton detector, is an organic scintillator. This material consists of mainly hydrogen and carbon, in the stoichiometric number ratio of approximately 1.0 to 2.0. The relative concentration of hydrogen varies with scintillator type.

Other configurations and materials, while conforming to the spirit of the rugged and portable detector described herein are envisioned. These materials and configurations allow for designing an instrument with severe cost constraints, severe space and mass constraints, specialized performance requirements, different energy ranges, different fields of view and other generalizations. In certain embodiments, a tri-materials design places the three materials in parallel planes, or orientation (D1, D2, D3). The thrust of the design is to enable a technology that possesses optimized sensitivity for neutron and gamma detection, imaging and spectroscopy from a radioactive or fissile source. One can generalize the mechanical design, allowing for the different sensor materials to be re-arranged, inverted or co-located. This flexibility of the mechanical design allows one to accommodate cost, volume and mass constraints and satisfy performance requirements.

For example, the D2 and D3 detector cells in two planes can be intermingled in a single plane, while keeping the D2 and D3 electronics separated. Although reducing collecting area from three to two planes, the instrument is compacted by 40% with a similar reduction in mass. Another possibility is to intermingle D1, D2 and D3 detector cells in two independent planes with similar distributions as described herein. The instrument then becomes one of tri-material, dual species and, most importantly, bi-directional at a cost of collecting area. Trade-off studies show that the concept is more marketable with greater utility for different users.

In certain embodiments, the material for D1 is nominally a plastic scintillator, but this could also be another organic scintillator, even one in liquid form. The material in D2 may also be organic, but has the property of being able to distinguish between gamma and neutron interactions within it. One PSD-capable material is stilbene, but other materials are becoming available that can duplicate this function, for example, p-terphenyl. Lastly, the D3 material could be bismuth germinate (BGO), NaI, or numerous other inorganic materials that are better than BGO, cheaper than BGO, faster than BGO, and the like.

Referring to FIG. 5, another embodiment is shown. In certain embodiments, there are several scintillation rods all the same diameter and/or length that are distributed radially around a central axis. In certain embodiments, the three detectors, D1, D2, and D3 are grouped in trios to provide optimized dual-species sensitivity. In certain embodiments, there may be other grouping or distributions to provide optimized detection.

Figure 3A:
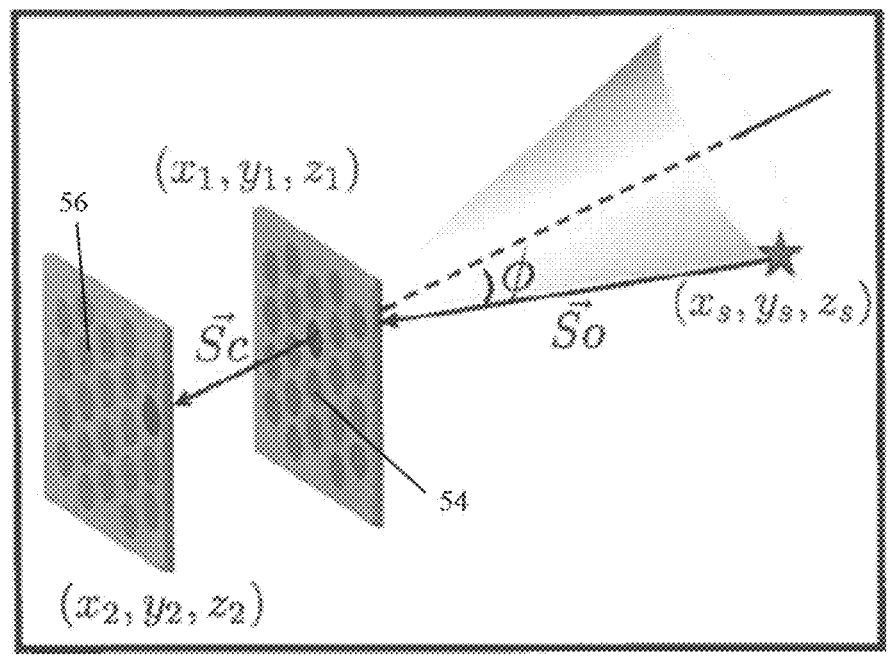
FIGS. 3A-B are schematic views of neutron double-scatter kinematics.
Figure 3B:
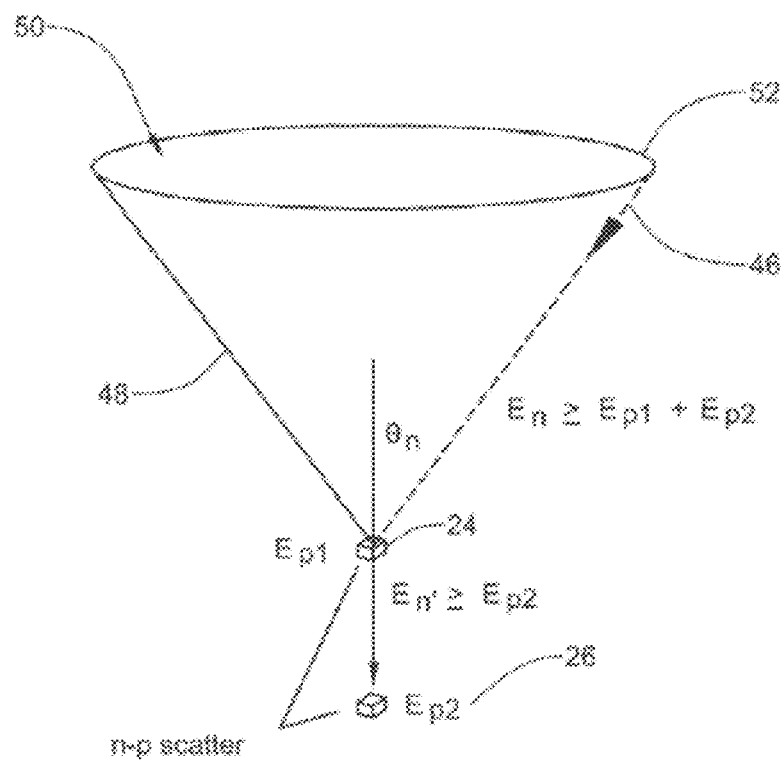

To perform imaging, an incident neutron must undergo an n-p scatter, like that shown in FIG. 3B, in each of two detectors. One must be able to follow the path of the neutron once it enters the instrument, measuring the location, relative time, and energy deposits of each n-p interaction. In the case of gamma rays, the same technique applies, but Compton-scatter electrons are used instead of protons.

Referring to FIGS. 3A-B, schematic views of neutron double-scatter kinematics are shown. A neutron 46, whose incident direction is unknown, undergoes two n-p scatters by detection by detectors 34, such as shown in FIGS. 4-5, to obtain information regarding the source. By measuring the spatial coordinates of the two interactions and time of flight (ToF), the energy and direction (i.e., momentum vector) of the scattered neutron is determined. By measuring the energy of the first recoil proton, the energy of the incident neutron as well as the scatter angle can be computed.

Energy information on a recoil proton, or Compton electron in the case of gamma rays, resulting from an elastic n-p scatter in a given scintillation detector, is obtained from the amplitude of the signals measured by the SiPM arrays at the first and second ends of the scintillation detector. Position information on the proton in the x-y plane is determined from the position in the x-y plane of the scintillation detector in which the interaction occurs. Position information on the proton along the z-axis is measured by analyzing the arrival time differences and/or the amplitude differences of signals measured by SiPM arrays at the ends of the scintillation detector in which the interaction occurs. The signals measured by the SiPM arrays at the ends of the scintillation detectors in which successive n-p scatters occur also provide a measure of the relative times of the successive scatters. With this information one can constrain the incident neutron direction to lie on the mantle 48 of a cone 50 about the recoil neutron velocity (as seen in FIG. 3B). The scatter angle is $\sin^2 \theta = Ep/En$. By projecting the cone 50 onto an object plane or sphere, one has an event circle 52 for each event, also shown in FIG. 3B. From the intersection of multiple event circles, or multiple cones, it is possible to obtain an image of a neutron source through statistical means.

The neutron and gamma ray detection system described herein is configured to use greater than 20 intersecting cones to localize sources of MeV neutrons and gamma rays within ±3° with an angular resolution of about 15°, or about 13° FWHM. The neutron and gamma ray detection system described herein may be configured for a radiation field of view of about 160° bi-directionally. The neutron and gamma ray detection system described herein may be configured for an optical field of view of about 160° horizontally and about 120° vertically.

Referring to FIG. 4, in one embodiment the detectors 34 in the first plate 21 are made up of 1 inch cells of plastic scintillator, read out by fast, rugged 1 inch SiPM arrays. The detectors on the second plate 22 are likewise made up of 1 inch cells read out by similar SiPM arrays. In certain embodiments, the first plate 21 and the second plate 22 are made up of plastic scintillators, stilbene, and inorganic scintillators such as sodium iodide (NaI). The detectors 34 are capable of pulse shape discrimination (PSD). Pulse shape discrimination (and Time of Flight (ToF)) allows the system to reject or distinguish gamma rays, important for high background environments.

Time of flight measurements are made between plates 21 and 22. All cells or detectors 34 represent independent data channels. When a neutron interacts with a detector 34 in the first plate 21, analog signals from that detector plate are generated from the analog sum of the different cells in first plate 21. Those signals initiate the ToF measurement, create a fast logic signal to test for time coincidence with what happens in the second plate 22, and serve as an analog pulse height for the energy deposited by the neutron in the first plate 21. The cell identification is taken to be the interaction location, i.e., a spatial resolution of 1 inch corresponding to a particular detector. Multiple signals from different detectors 34 in the first plate 21 are rejected. Similar signal processing takes place in the second plate 22, where the sum signal stops the ToF measurement and the cells that trigger are identified and recorded.

The stilbene detectors, PSD-capable organic scintillator detector, of the second plate 22 possess pulse shape discrimination properties. This property of the scintillator produces analog signals that can be used to identify whether the ionizing particle is either fast (electron, muon) or slow (proton or heavy ion). The system and method described herein is capable of detection using analog signals with equivalent accuracy and speed as an equivalent system would be using digital signals through the use of fast timing circuitry. Pulse shape discrimination using analog signals in the system and method described herein is equivalent to using digital signals. The two types of particles differ in their detailed pulse shape—a function of the chemistry of the scintillator. Neutron-initiated events can thus be identified and selected for further data analysis. Electron ionization pulse shapes are generally discarded.

It is contemplated that the first plane 21 and the second plane 22 may be separated by distances ranging from 5-50 cm. Shorter separation distances between the first plate 21 and the second plate 22 would work well for compact instruments, the tradeoff being that the angular resolution degrades unless the scintillator elements get smaller. In one embodiment, the two plates 21 and 22 are separated by 30 cm, scintillator to scintillator. A gamma ray over this distance registers a 1 ns ToF, while a 1-MeV neutron requires 30 ns to cover the same distance. Oblique trajectories yield longer ToF values, but this effect is corrected with the event location information provided by the cell identifications. The ToF range may be on the order of 50 ns, extending above and below typical fast neutron speeds. By having a longer ToF range, one automatically obtains a measure of the accidental coincidence rate—an important measurement in intense radiation environments.

As indicated above, one embodiment of the system is designed to be portable. In certain embodiments, the system is designed to operate eight hours on battery power with each plate populated with several detector cells. The batteries may be rechargeable. It is contemplated that the system described herein is capable of operation using low voltage, i.e. less than 40 volts, less than 35 volts, or less than 30 volts. The system may be configured for operation in temperatures between 0° C. and 40° C.

Analog data are processed in an on-board computer, which is part of the electronic and processing unit, digitized and formatted for transmission to a remote computer for real-time monitoring or analysis and/or data archiving. The connection between the on-board and remote computers can be by ethernet cable, wireless communications, or the like.

Figure 24:
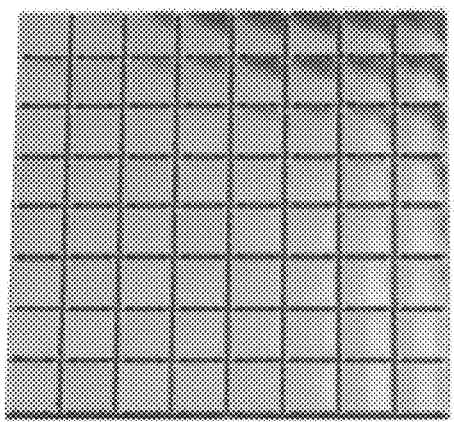
FIG. 24 is an example photomultiplier array (SiPM) as used in some embodiments of the disclosure.
Figure 24:
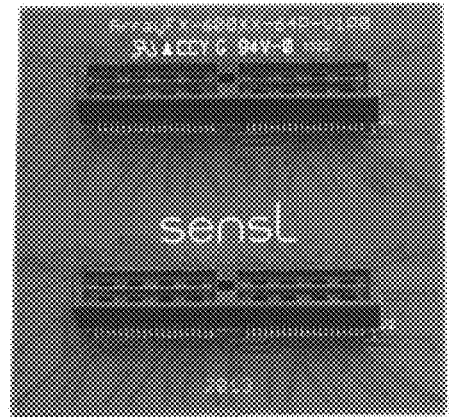

In some embodiments, individual detector layer cases containing a plurality of scintillation detectors, a plurality of SiPM (silicon photomultiplier) arrays, one or more cameras, and layer electronics may be assembled. SiPM arrays are available, for example, from SensL, Ltd. An example SiPM array is shown in FIG. 24. The components may be arranged in different ways within the case. Two or more detector layer cases may be combined in a stacked arrangement in the vicinity of a target detection area. Individual detector layer cases may be configured with corners that easily stack together. For example, specialized mounting corners may be attached to the top of each case such that another case may fit into place in a secure, reliable way. It is contemplated that each case may weight about 20-30 lbs. In one embodiment, the dimensions of a single case may be about 18.5"×14"×7". In one embodiment, the alignment frame base may be 23.5"×20".

It is contemplated that in an embodiment where a single camera is placed in a single detector layer case, each camera may have visibility of neutrons and gamma rays unidirectionally. It is contemplated that in an embodiment where multiple cases are used, each case being provided with a camera, each camera may add an additional direction of viewing (i.e. use of two detector layer cases placed in opposition would yield bidirectional viewing).

Figure 2:
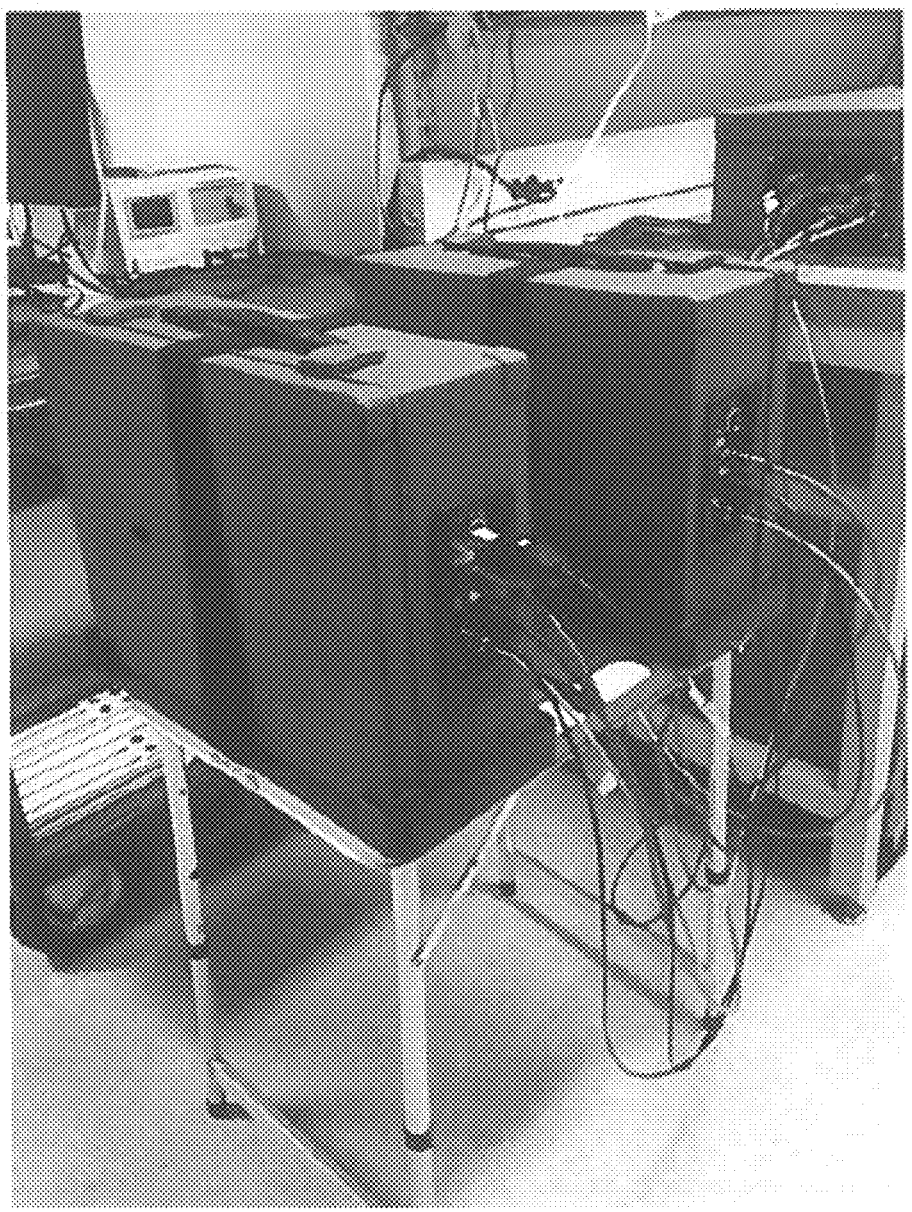
FIG. 2 is a perspective view of a three case system of one embodiment of an imaging neutron/gamma spectrometer system.

In one embodiment, shown in FIG. 1, two detector layer cases and one DPU (digital processing unit) case are used to form a complete system. The DPU may comprise a central processing unit (CPU), a field programmable gate array (FPGA), a set of rechargeable batteries, and a set of regulators. As shown in FIGS. 1-2 ports are provided on the outside of each case to provide a communication link. It is contemplated that communication between detector layer cases and the DPU case may be accomplished wirelessly. It is contemplated that it may be necessary to have a single coax cable to transmit the fast timing signal from the detector layer case to the digital processing unit case. It is contemplated that the system may transmit signal in analog.

Figure 7:
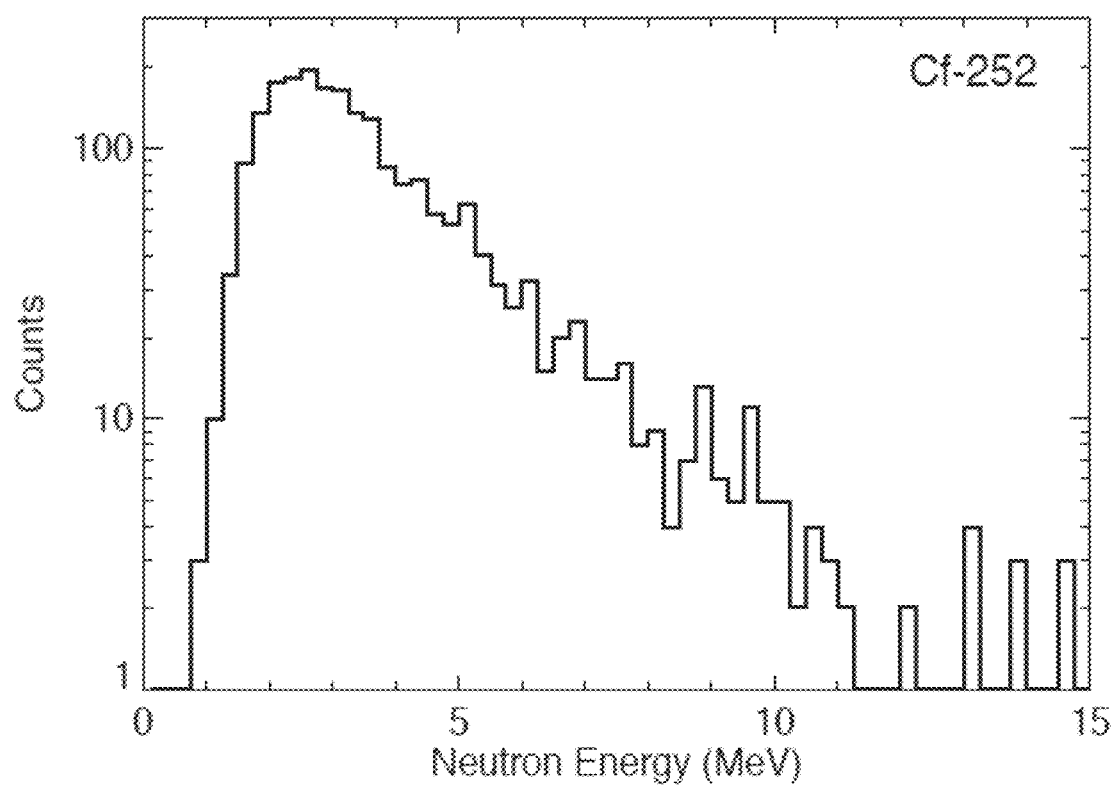
FIG. 7 is a graph of system response to $^{252}$Cf (Californium).
Figure 8:
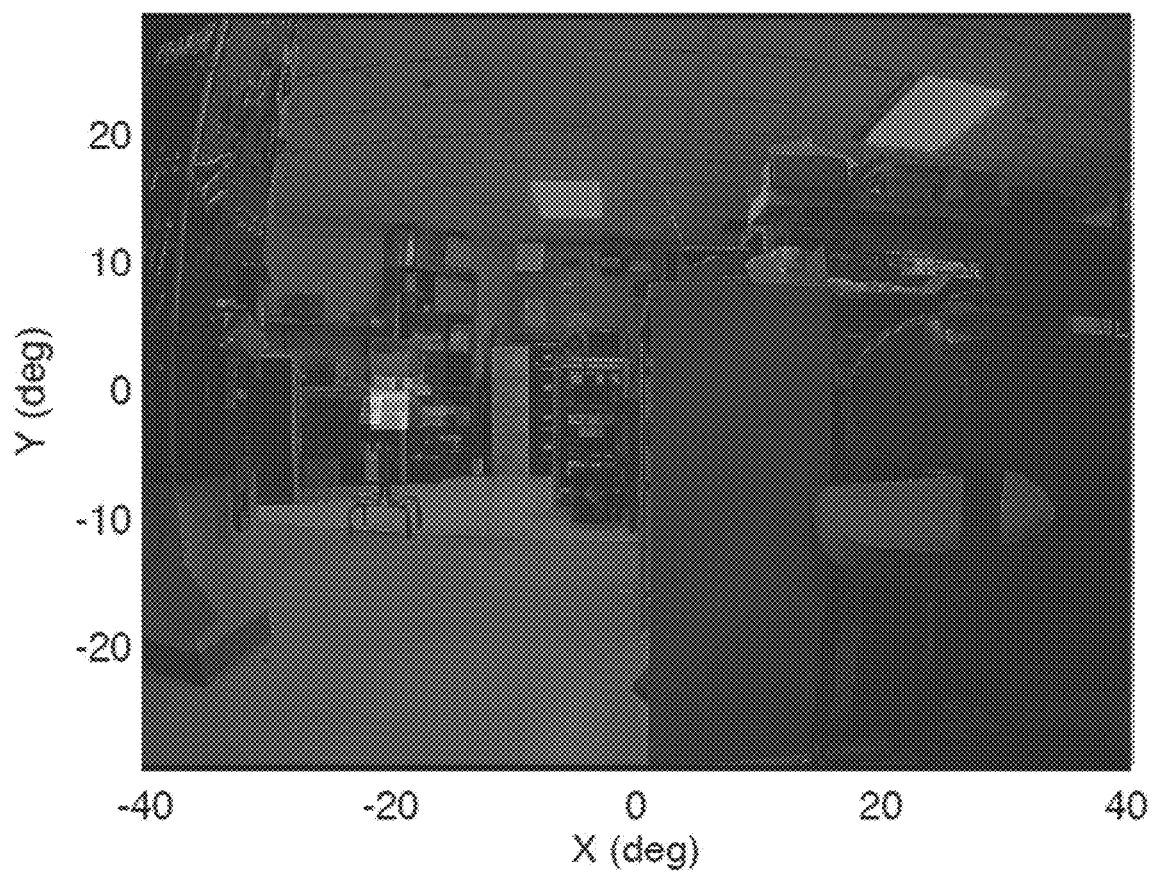
FIG. 8 is a graph of neutron image made from the same data as shown in FIG. 7 and overlaid on an optical camera frame.

In one embodiment, the system can be controlled through a remote computer. The system can be controlled by a tablet computer (such as that shown in FIG. 6), a laptop computer, and/or a desktop computer. In one embodiment, control of the system through the remote computer can be accomplished wirelessly. In one embodiment, control of the system through the remote computer can be accomplished using an Ethernet cable and a pair of Ethernet ports. A tablet-based graphical user interface may include a display screen such as that shown in FIG. 6. The graphical user interface may be a webpage-based graphical user interface. The display in FIG. 8 illustrates a neutron image made from the same data as is shown in FIG. 7 from a $^{252}$Cf source. The neutron image in FIG. 8 is overlaid on an optical camera frame. In some embodiments, the position of the source can be localized to ±3° for a system utilizing two detector layer cases, one DPU case, and two 6×6 detector arrays.

Figure 9:
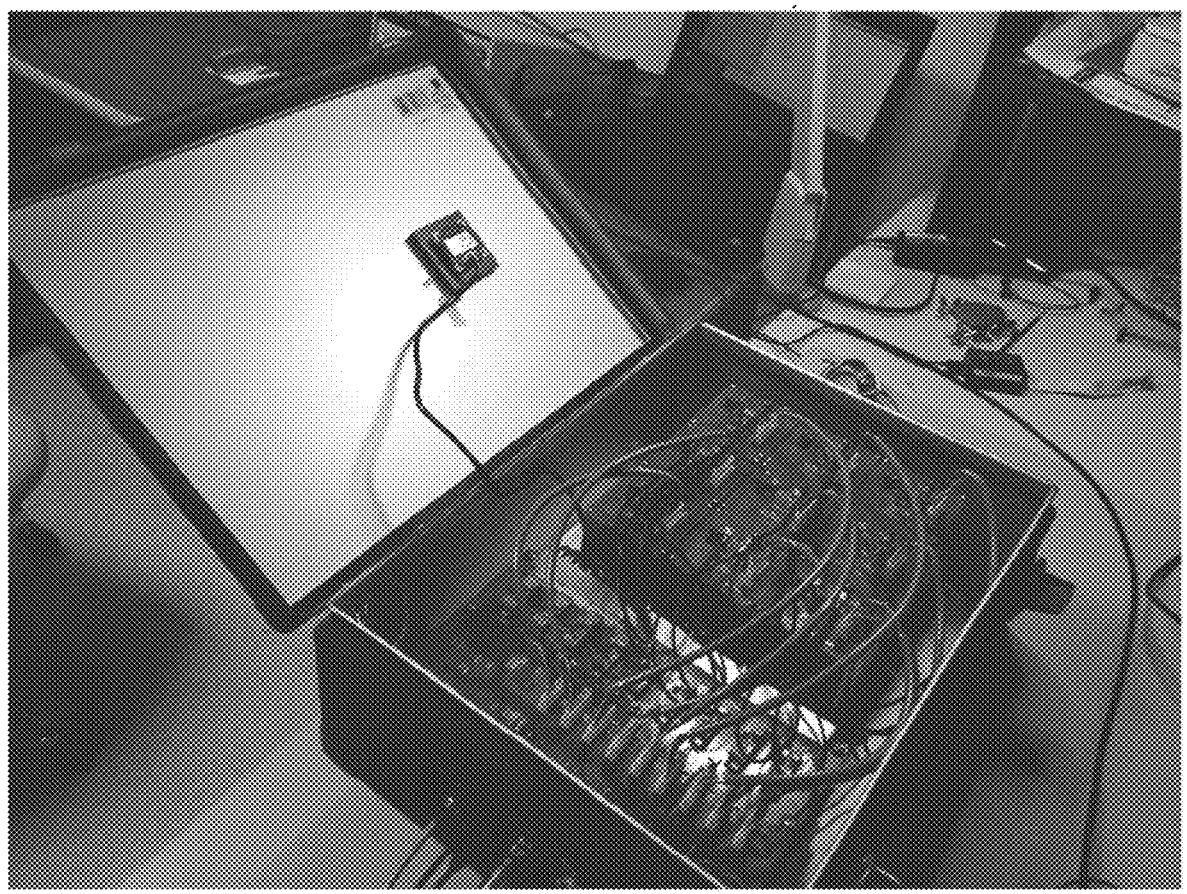
FIG. 9 is a representation of the electronics on the inside of a portable case, in one embodiment.
Figure 25:
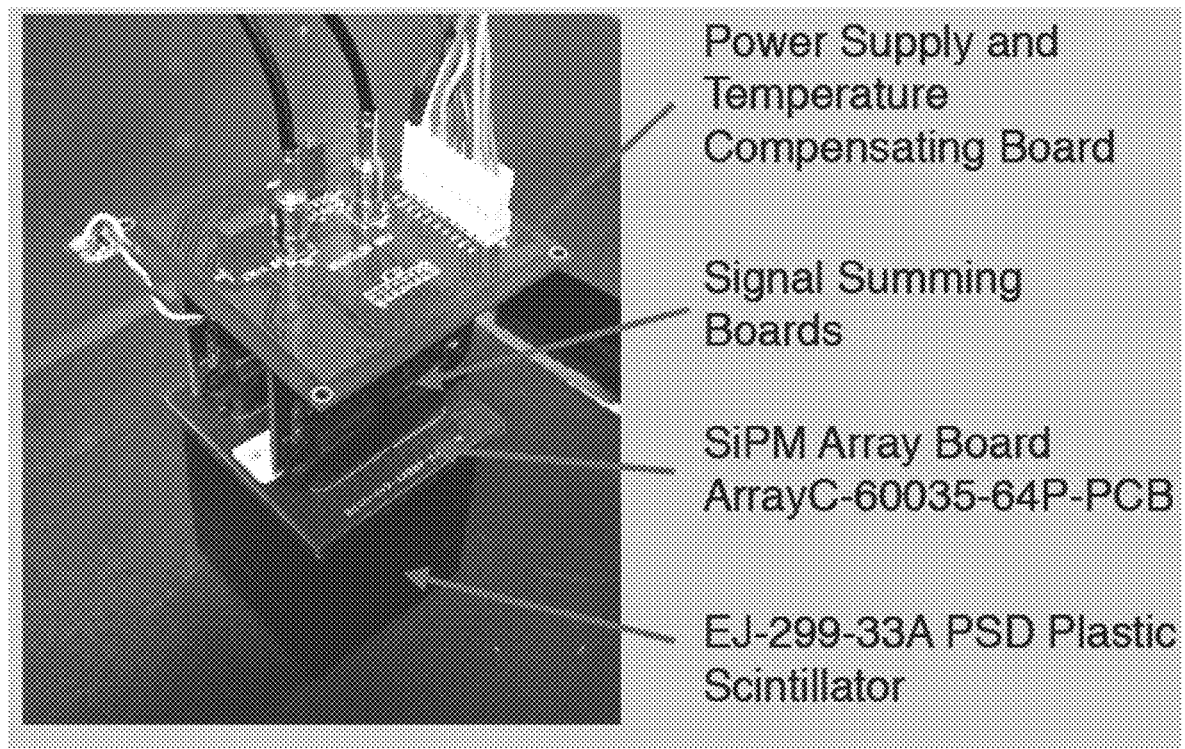
FIG. 25 is a photograph of the physical arrangement of electronics boards adjacent to a scintillation detector, in one embodiment of the disclosure.

Improved signal summing and processing is accomplished in the system through, for example, the analog electronics design. The analog electronics design enables fast processing even though high capacitance may be involved. The readout may be optimized for fast signal transfer to the display. The physical arrangement of parts may be optimized to minimize the required volume within each detector layer case. Individual SiPM (silicon photomultiplier) arrays may be overlaid on individual scintillation detector elements in a matrix within a given detector plane. FIG. 1 and FIG. 9 detail a 3×3 matrix of SiPM boards which are sitting on top of a 3×3 matrix of scintillation detectors. FIG. 24 is a photograph of an example SiPM array board as used in one embodiment of the disclosure. In this example, the SiPM array is an 8×8 array. FIG. 25 illustrates a power supply and temperature compensating board positioned on two signal summing boards, positioned on a SiPM array board, positioned on a plastic scintillator, in one embodiment.

Figure 26:
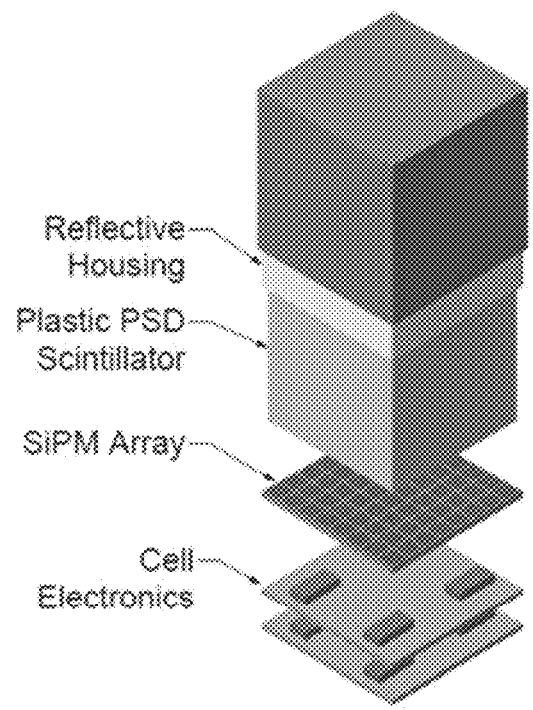
FIG. 26 is an example stacked arrangement of cell electronics boards, a SiPM array, a scintillation detector, and reflective housing, in one embodiment of the disclosure.

FIG. 26 shows a stacked arrangement of cell electronics boards, SiPM array, a scintillation detector, and reflective housing, in one embodiment of the disclosure. The layers may be arranged in a compact rectangular prism. Each rectangular prism may form one cell in an array contained in a portable case.

Figure 27:
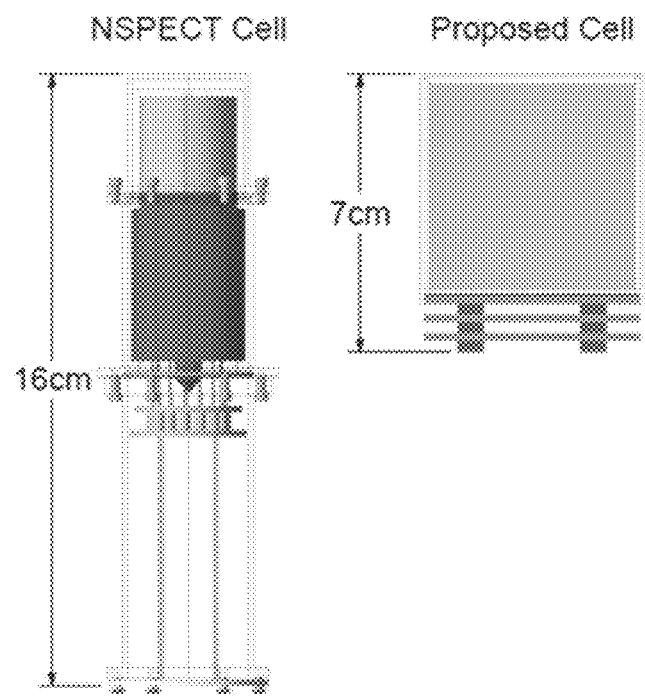
FIG. 27 is an illustration comparing the size of a single cell in the prior NSPECT design and the smaller size of a single cell, in one embodiment of the disclosure.

FIG. 27 is a comparison the size of a single cell in the prior NSPECT design and the smaller size of a single cell of the improved system, in one embodiment of the disclosure. One advantage provided by the embodiments presented in the present disclosure is more compact size of the scintillation detector and associated elements.

Figure 28:
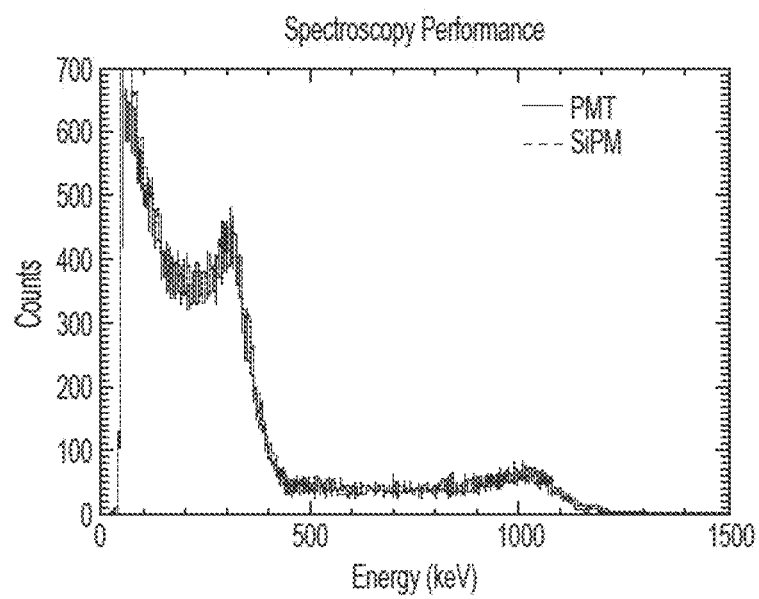
FIG. 28 is a graphical representation of the number of counts detected by a standard photomultiplier (PMT) as compared to the silicon photomultiplier (SiPM).
Figure 29:
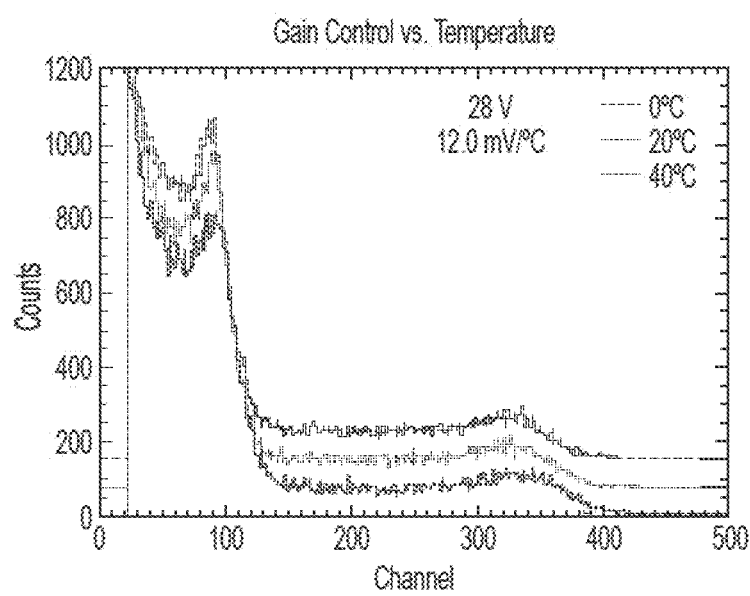
FIG. 29 is a graphical representation of gain control vs. temperature at 0° C., 20° C., and 40° C.
Figure 30:
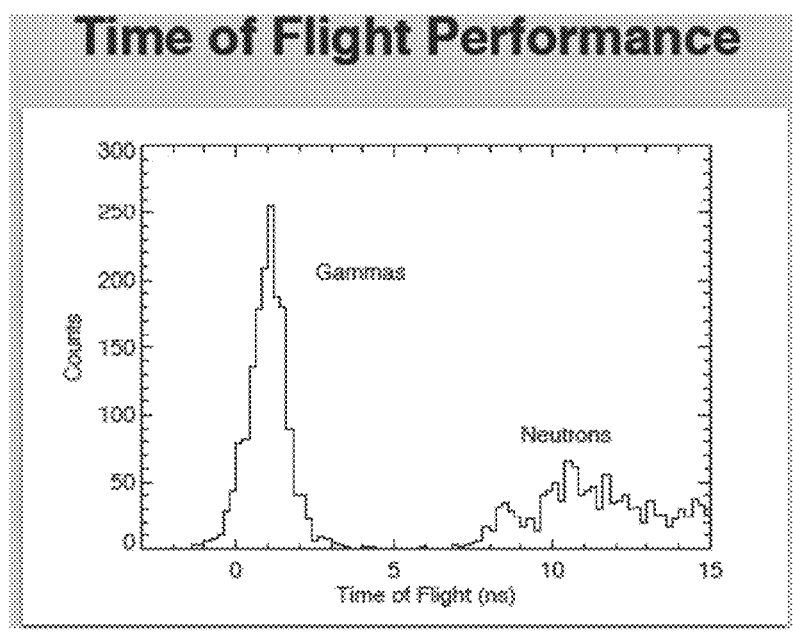
FIG. 30 is a graphical representation of time of flight performance of one embodiment of the disclosure.
Figure 31:
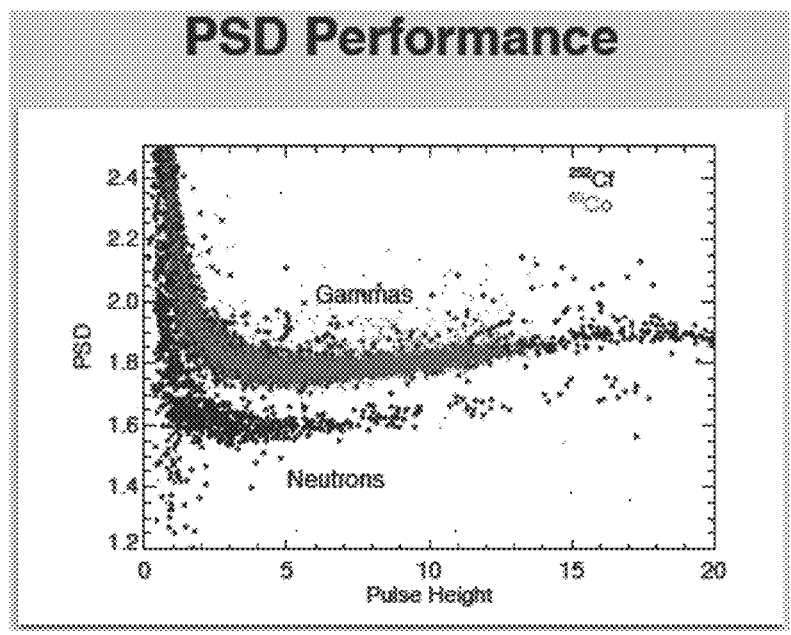
FIG. 31 is a graphical representation of pulse shape discrimination (PSD) performance vs. pulse height, in one embodiment of the disclosure.

FIGS. 28-31 illustrate that clear gamma ray and neutron discrimination can be achieved with the pulse shape discrimination and time of flight electronics described herein. Further, this detection is possible in a portable, field-deployable system. In FIG. 28, the number of counts detected is illustrated by a standard photomultiplier (PMT) as compared to the silicon photomultiplier (SiPM). The SiPM is able to achieve comparable detection as the standard PMT but with a compact design. In FIG. 29, gain control vs. temperature is shown at 0° C., 20° C., and 40° C. Gains may be temperature sensitive. FIGS. 30-31 show clear differentiation of gamma rays and neutrons, illustrated using time of flight and pulse shape discrimination, respectively.

Figure 18:
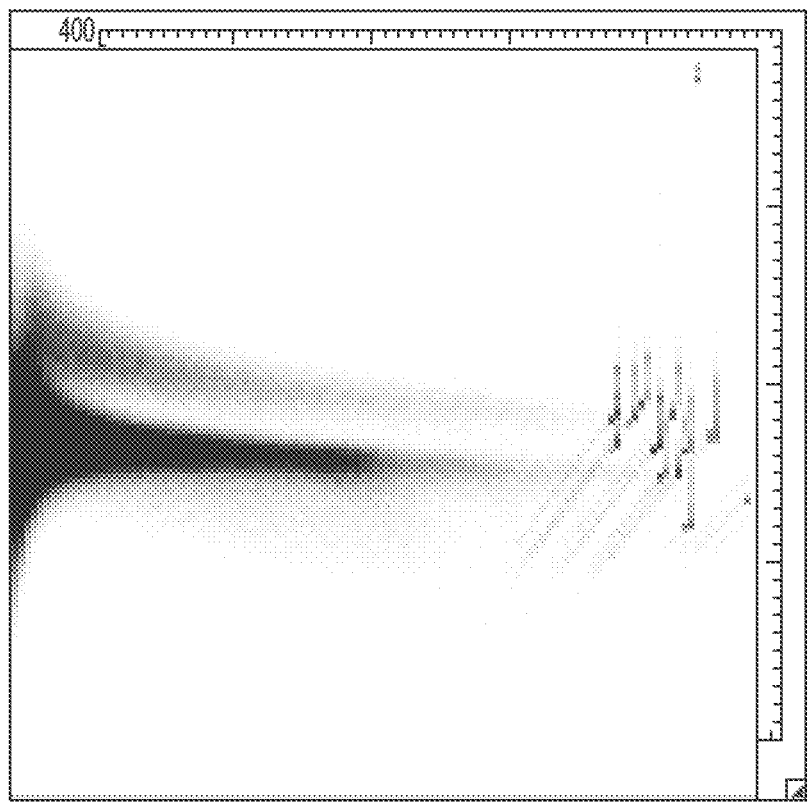
FIG. 18 is a plot of PSD vs. energy, including energy calibrations and PSD offset applied, in one embodiment of the disclosure.
Figure 19:
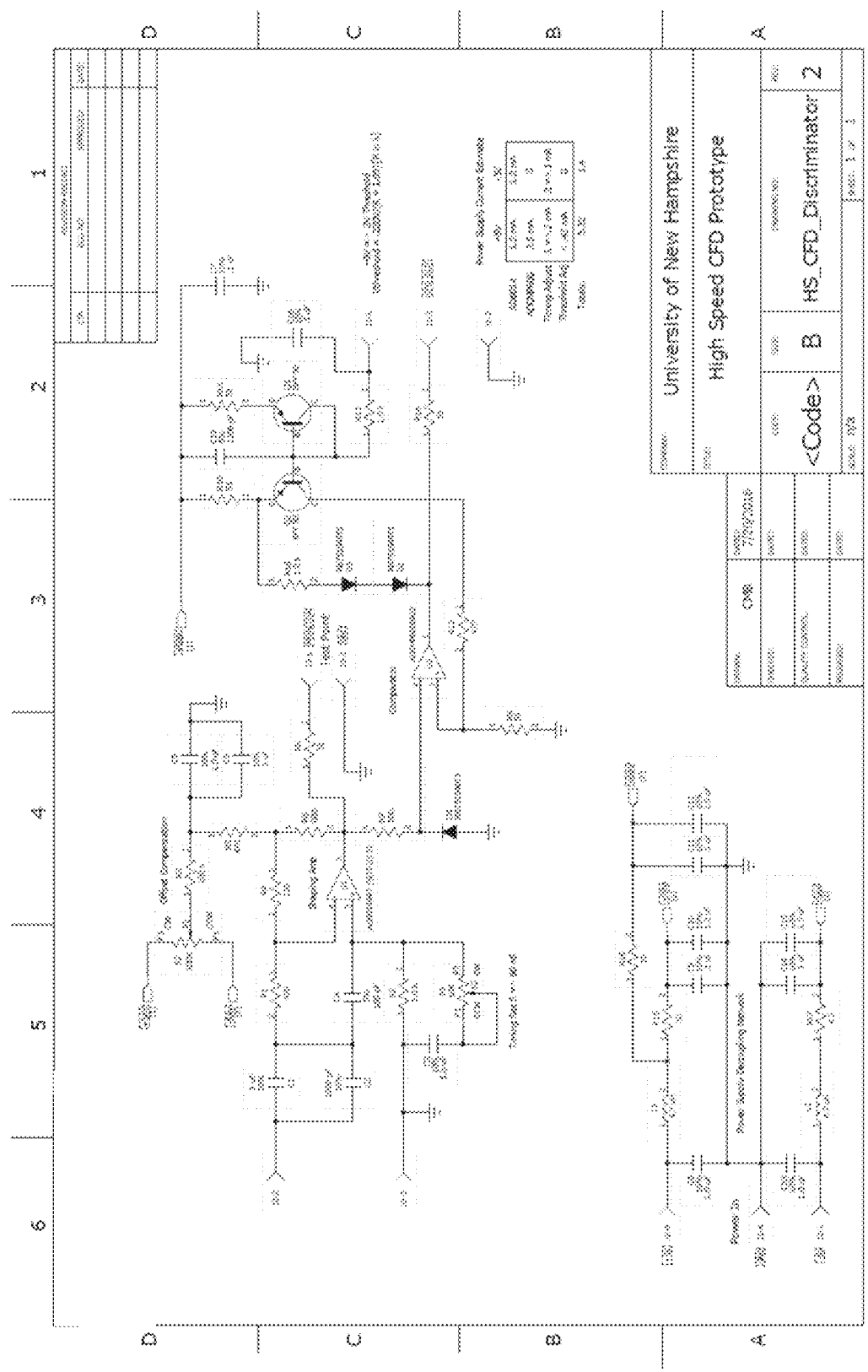
FIG. 19 is a schematic of a high speed CFD circuit, in one embodiment of the disclosure.
Figure 20:
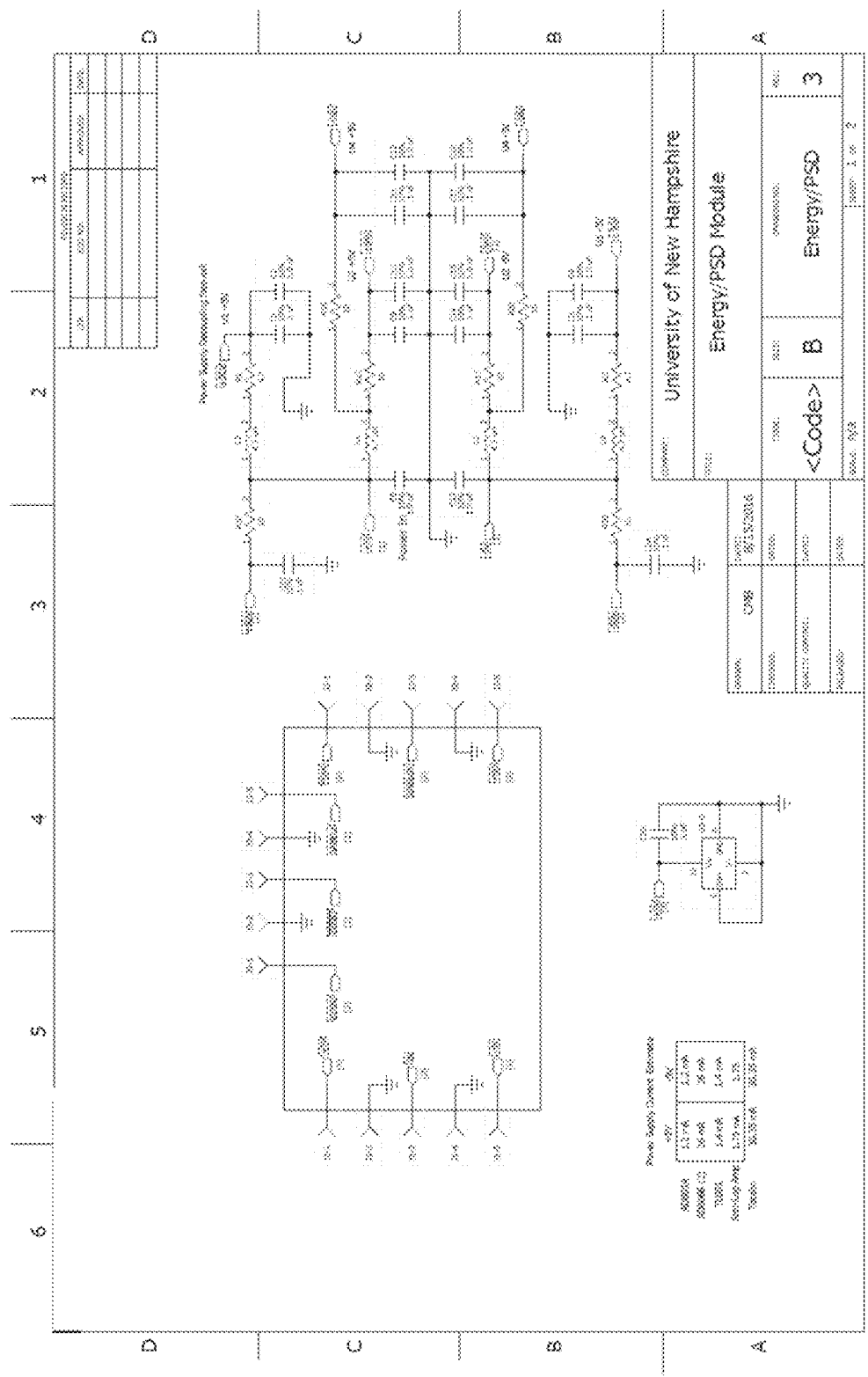
FIG. 20 is a schematic of an energy pulse shape discrimination module, in one embodiment of the disclosure.
Figure 21:
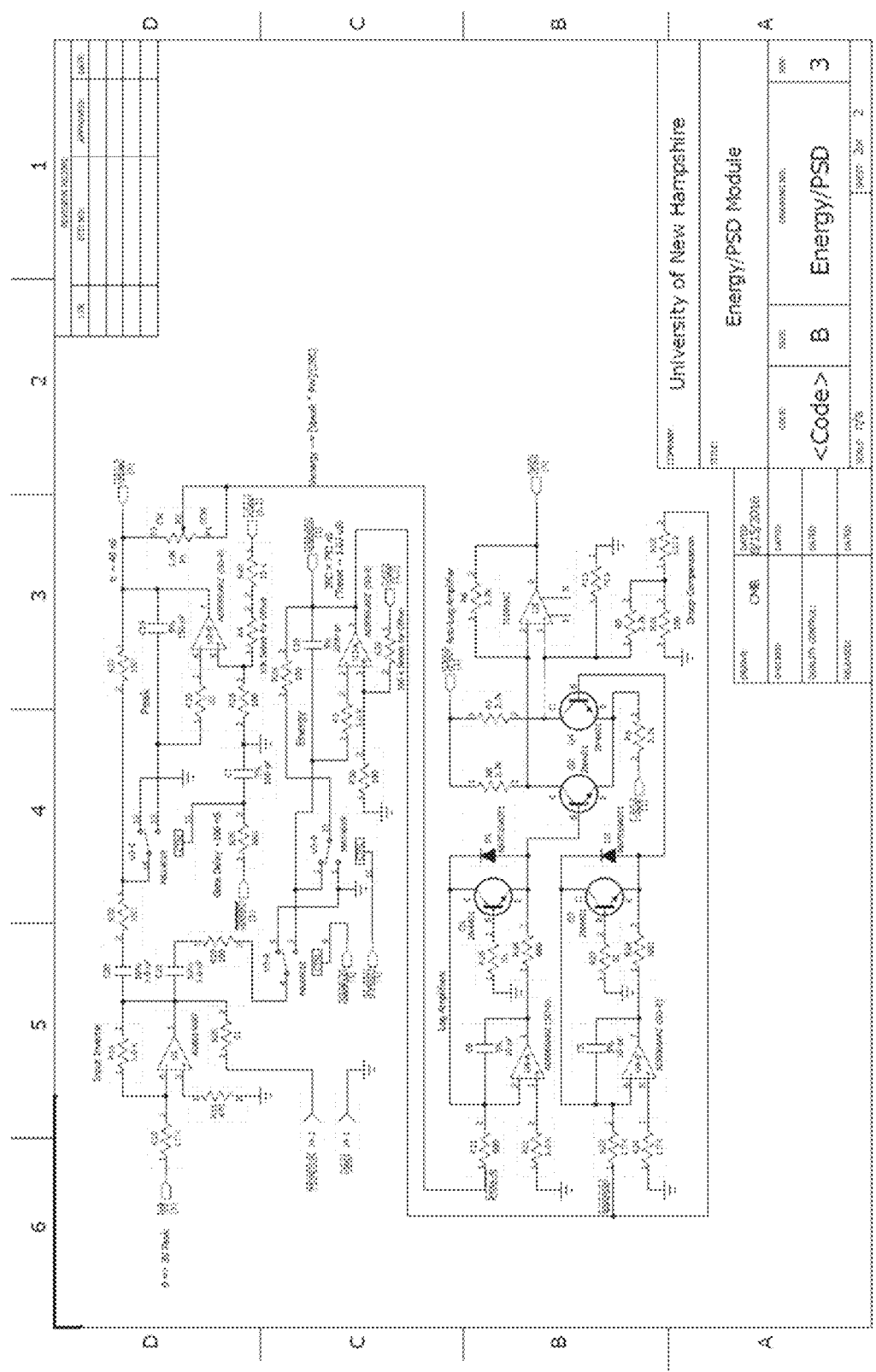
FIG. 21 is a schematic of an energy pulse shape discrimination module, in one embodiment of the disclosure.

FIG. 31 details a graphical representation of results of an approach for discriminating between neutrons and gamma rays, which was developed early in the PSD system development. The system used to generate FIG. 31 used a single detector and processing of a large array of parallel SiPMT detectors to demonstrate that it is possible to provide discrimination over a useful range of energies. FIG. 31 illustrates significant variations in event energy that can add complexity to the discrimination processing. FIG. 18 shows the performance achieved with the system shown in FIG. 31.

In one embodiment, the system can be controlled through a remote computer. The remote computer monitors many housekeeping parameters, such as temperature, voltages, count rates in all detector cells and other rates, important for assessing instrument behavior and performance. Gains in the SiPM arrays are configurable. In some embodiments, the gain is temperature sensitive and may affect the bias voltage supply. Outside the range of 0° C. and 40° C., the gain may be affected. For example, the system may become noisier as the temperature increases.

A test of the system to measure neutrons with the first plate 21 and the second plate 22 was also (1) a test of the performance on the electronics for each plate simultaneously to process signals from multiple cells; and (2) a test of the ability to trim the gains and thresholds of six cells, so that they acted like a single instrument with minimal dispersion in the spectrum and image because of gain and threshold variations. For the exercise, a $^{252}$Cf source was placed on axis at a distance of about 3.4 m.

Referring to FIG. 7, a graph of system response to $^{252}$Cf (Californium) is shown. The neutron trajectory for each combination of cells is different and each kinematically measured scattered angle must agree with the scatter angle measured by simple geometry. To measure the spectrum of the neutron source, events were selected for which the measured scatter angle was within ±3° of the true angle. The results, i.e. count spectrum, are shown in FIG. 7. Large numbers of counts were detected at low neutron energy ranges (i.e. 1-5 MeV).

This system or instrument may be useful in mixed radiation environments, but typically neutron environments that are also rich in gamma rays. One application is for security use, either by the Department of Defense (DoD) or Department of Homeland Security (DHS) or any number of agencies responsible for identifying fissile or radioactive material. One example is a state police force responsible for monitoring or screening traffic in and out of a major city. However, the nuclear power industry could also find a dual species instrument useful for monitoring nuclear fuel and any associated gamma-ray emission.

The DoD/DHS use envisioned is one where a neutron emitting quantity of material is cloaked in other materials. A dual species camera can not only identify the source of the neutron emission but also identify the gamma-ray emission induced by the presence of neutrons. The gamma-ray emission carries with it signatures of the material cloaking the neutron source, e.g., plutonium. The most exciting example is that the neutron emission excites nitrogen nuclei in surrounding high explosives (rich in nitrogen). The neutrons may not be seen directly, but the characteristic signatures of nitrogen excitation can still be detected. Any agent could have additional information, not only of the neutron source but also of the surrounding material.

It is also recognized that a first plate with stilbene detectors or other detectors that possess PSD properties could be used with a second plate having both plastic and inorganic detectors. The detectors in the first plate would then provide PSD for both neutron and gamma detection.

Enhanced Constant Fraction Discrimination (CFD) System

In some embodiments, an enhanced constant fraction discrimination (CFD) system is provided. The enhanced CFD system provides advantages over a conventional CFD. A conventional CFD may have a limited dynamic range, may be difficult to configure, and may be complicated to implement. A conventional CFD may generate a high level of electromagnetic interference (EMI), disrupting low level input signals and requiring component changes to make adjustments.

The enhanced CFD system is simpler, with less than half the parts count, lower power requirements and layout area requirements, is adjustable without having to change parts, has lower levels of EMI, and provides a larger dynamic range. The enhanced CFD system is trimmed easily without changing parts to match timing across multiple units for applications as time of flight measurements with resolutions to sub-nanoseconds.

The CFD system design approach described herein utilizes low power and noise and is configured for tuning for precision timing and matching between units. The improved constant fraction discrimination system can be used in a wide array of applications including, for example, terrestrial and space applications where substantially more complex and fragile approaches are currently required. The very low noise and complexity permits an overall reduction in unit size and assembly of large arrays of detectors without noise problems and simple matching of timing offsets while low enough power to permit battery operation.

In some embodiments, modifications were made to improve constant fraction discrimination (CFD). Standard CFD is used for accurate time resolution of high speed signals to eliminate the walk, or change in time measurements due to the finite rise time of the signal to be measured, with a fixed level discriminator. The timing resolution of pulse amplitude is limited by the event rise time and rise time variations between events. This is particularly an issue with photon counting systems, where the number of photons per event to be counted is low. With high gain photon and particle detectors, each arriving particle or photon may have very high gains, ranging up to $10^7$ or greater. Each particle triggers a bundle of charge at discrete times corresponding to the particle arrival time, and is thus an accumulation of bundles of charge or quanta spread over an interval of time. As any statistical process, the event to event variations, in arrival times between quanta, have a RMS value that is approximately given by the square root of the number of events. Thus, the observed amplitude and rise time vary by approximately the square of the root of the number of quanta involved in the event, or in the examined interval.

For low energy detection, this may be as low as 3 to 10 quanta. So, the variation may be as much as 70% (3 quanta) to 30% (10 quanta) regardless of levels of amplification.

A conventional CFD is an approach to minimize this variation by reducing the variations in amplitude. Timing accuracy can be no better than the rise time of the event. A constant fraction detector uses the approach of summing the signal with amplified and delayed version such that the resulting zero crossing of the summed signal is invariant with amplitude. This provides a substantial improvement in timing by eliminating the timing variation associated with the amplitude and somewhat the variation with rise time. If the delay and scaling are chosen to maximize the signal levels, where the delay is about half the rise time and the delayed amplitude is twice the undelayed signal, then the apparent delay varies as half the variation in rise time and the output signal is half the amplitude of the undelayed input signal.

Figure 15:
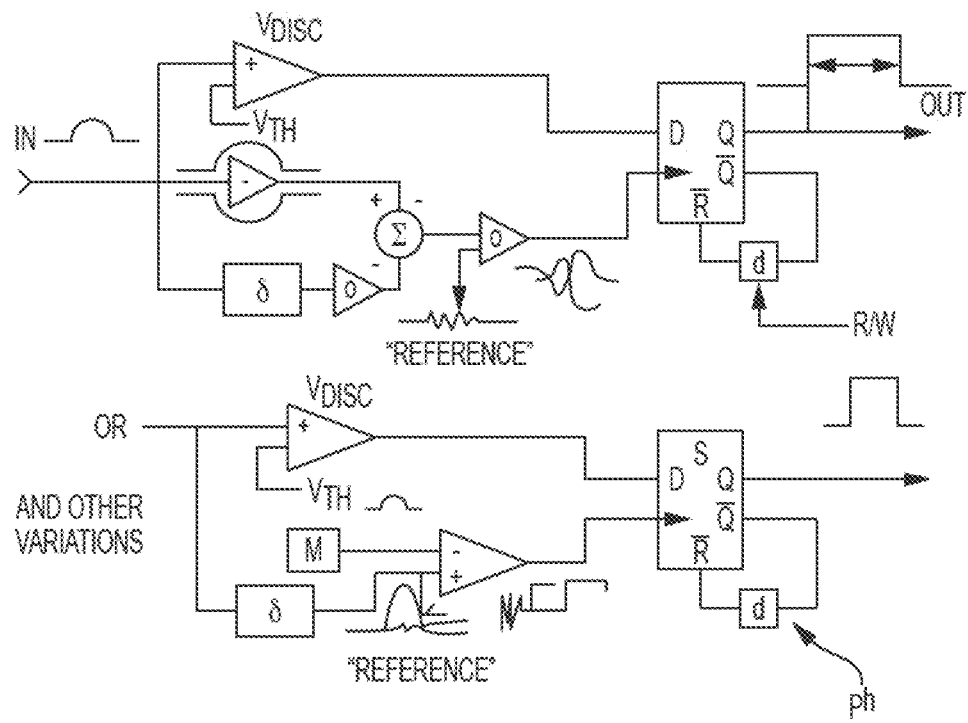
FIG. 15 is an example circuit diagram for one embodiment of the disclosure including timing delay enhancement.

If this is modified to reduce the variation in rise time, a shorter delay and higher delayed amplitude is required. An example circuit for this purpose is shown in FIG. 15.

For large level signals, this provides excellent results, but has a number of limitations including high complexity. Multiple devices and two parallel processing plates may be required. There is an accumulation of propagation delays from each device and element that cumulatively add to time variations as a function of amplitude, component aging, temperature, supply variations, etc. The required amplification or attenuation limits the input signal dynamic range.

The operation of the timing apparatus on the summed signal and delayed version means that if there is no signal present the timing comparator may be randomly triggering. For accurate timing, the output of this comparator must be fast, with rise and fall times of a few nanoseconds or less. This couples to the input even with harmonic suppression efforts to provide a minimum detectable signal at the threshold discrimination. Some manufacturers use this detection to "time" the timing discriminator to reduce walk at two signal levels by scaling an offset to provide a symmetrical output of the comparator. That is, equal time high and low at the comparator output.

The delay is provided by a transmission line or discrete delay line. For short delays, this can be accomplished with a length of coax cable, which provides roughly 2 ns per foot of cable. This requires significant volume, so discrete delay lines are used. A discrete delay line is inherently a low pass filter, and depending on the configuration of inductor or capacitance, input can substantially increase transient noise if capacitive input or ringing is inductive, even with a matched input impedance. One potential associated problem with the discrete version is the low pass character in the delay branch, and unless matched in the undelayed branch provides excess walk as a function of rise time variations.

Further, since the required delay for a given performance requirement varies as a function of application, the delay line or discrete filter must be specifically selected for each case, and cannot be changed or tuned without changing the parts involved.

For high speed application, the issue of the comparator behavior complicates the operation. Inherent to any amplifier or comparator is a requirement of a certain level of charge supplied to the input before a signal begins to propagate through the device. The charge is delivered to the input as a current, defined as charge per unit time. With a non-zero resistance at a comparator, to reach a level Q of charge at the comparator input is the rate of charge delivery. $I=\Delta V/R_{in}=Q/T$ so that the time to start the signal processing is just that charge times the input resistance divided by the change in voltage, os $T=Q \cdot R/\Delta V_{in}$. QR is constant, so the time for a comparator to start processing a signal, or the effective timing skew varies inversely as the magnitude of input voltage. This gives rise to the observed increase in comparator propagation time with decreasing signal levels, and for a conventional CFD is compensated for with an offset input voltage at the comparator input. Since there are two comparators in the CFD, they must be matched in the case of high speed, large dynamic range signals.

The innovation here addressed all of these issues, to provide a CFD design and approach that uses less than half the components and therefore area, with a single signal processor path and comparator, while providing the ability to work with a broad range of input signals without requiring different cables or components, while eliminating the noise and matching requirements of a conventional approach. This can be accomplished with as few as two ICs and two support transistors if an electronically adjustable threshold is required.

The design solution uses the combination of a unique input signal processing and a simplified comparator configuration to address all the issues identified with a conventional CFD configuration to provide a compact, low power unit with more than double the dB dynamic range (20-30 dB to 40-60 dB), with timing resolution to the 10's to 100's of picoseconds. For reference, light or other electromagnetic radiation takes approximately 84 picoseconds to travel one inch in free space, so this provides a timing accuracy much better than the time for light to travel an inch.

Figure 16:
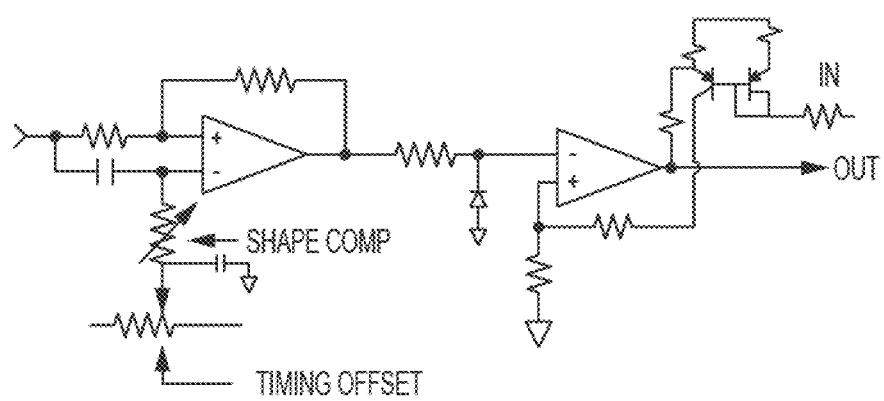
FIG. 16 is an example circuit diagram for one embodiment of the disclosure for improving CFD operation.

The design uses a combination of an adjustable, amplified non-minimal filter and a novel comparator configuration to provide with CFD operation, as illustrated in FIG. 16.

If the frequency is very high, in one embodiment, then a capacitor looks like a short circuit, so the amplifier positive input is tied directly to the input. Thus, the voltage across the amplifier input is zero and there is zero current across $R_{in-}$. Since there is no current in or out of the inverting amplifier input, the voltage across $R_+$ must also be zero. With no current in $R_{in}$ and $R_+$, then $V_{out}$ must be equal to $V_{in}$, providing a buffered, non-inverted signal, or $V_{out}=V_{in}$.

If the frequency is very low, in one embodiment, then the capacitor looks like an open circuit, so the amplifier positive input is tired to ground. Thus, the amplifier will respond so to make the negative input zero volts as well. Thus, the voltage across $R_{in-}$ is the input voltage to ground, and if $R_f$ is the same value as $R_{in-}$, then the voltage at $V_{out}$ is just the input voltage inverted, so $V_{out}=-V_{in}$.

As the frequency varies, the output signal varies in phase, but not amplitude, such that when the frequency is $1(2\pi R_{in}C)$, the phase at the output is $-90°$. In the time domain for a step function in, this is equivalent to the output signal transition through zero, or $\tau=R_{in+}C$.

In one embodiment, when used for pulse shaping with an input signal with a finite rise time, this time constant is set such that the zero-crossing time occurs when the input signal is maximum, as with a conventional CFD.

In one embodiment, as with a conventional CFD, the resulting peak positive amplitude is ½ or less than the peak of the input signal, which reduces the dynamic range overall by the same factor. However, with the non-minimal filter, the addition of one resistor from the negative input to ground provides gain at the output without otherwise affecting the response. As in the earlier analysis, for the high-speed signal, the voltage difference between the positive and negative inputs is maintained as zero volts. So, if there is a resistor to ground with the input voltage across it, this current must be supported across the feedback resistor. Thus, the resistors are equal, the output voltage will be twice the input voltage, so $V_{out}=2V_{in}=R_F/R_G$.

In this manner, the output voltage is matched to the input voltage when the delay is set to match the rise time, such that the dynamic range matches that of the input signal.

If $R_{in-}$ and $R_{in+}$ are equal, then the input of the circuit remains constant in magnitude over frequency, eliminating any non-linear effects due to impedance matching.

For the low frequency signal, since the negative input is ground referenced, the gain is given by $V_{out}=V_{in}*R_F/R_{in}$. For symmetry, $R_{in+}=R_{in-}=\frac{1}{2}R_g=\frac{1}{2}R_f$. Other balance points can be set with gains other than 2. A better rejection of rise time variations can be provided if the balance is at one third of the rise time, as the rise time variation will tend to cancel, but without the penalty of reduced dynamic range inherent with the conventional CFD.

Another innovation in the design is the comparator. While the shape can be used with the conventional CFD approach, it retains the problems of matching paths, and differential propagation delays between devices, over time and temperature. The approach implemented in this embodiment eliminates the multiple paths and noise issues inherent with the previous realization with a simple single comparator configuration that provides both functions of level discrimination and precise timing. The result is to eliminate the inherent variations in timing and speed, and simultaneously eliminate the requirement to additional logic to combine the level and timing signals. This has the additional advantage of faster overall operation, since the unit is inherently reset without requiring additional timing circuitry or the duration of the output pulse.

Figure 17:
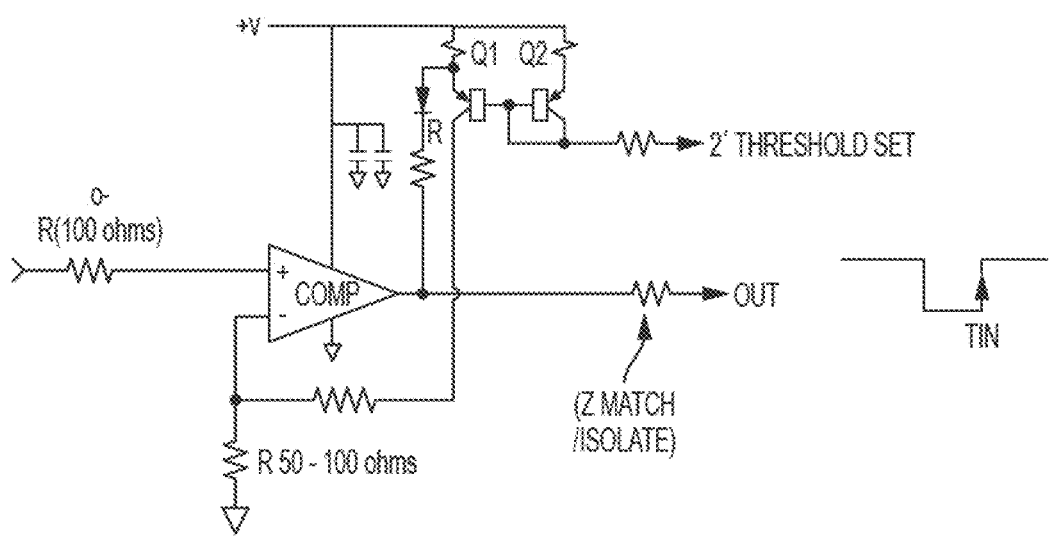
FIG. 17 is a schematic of a single comparator to both determine threshold and provide precision timing, in one embodiment of the disclosure.

One embodiment uses the single comparator to both determine the threshold and provide precision timing, without requiring the additional logic gate to combine signals. Another major advantage is the elimination of the timing comparators that necessarily has to be switching on noise when there is no event being processed. Since this comparator must necessarily be very fast, with very fast rising and falling edges in order to provide the timing accuracy, it generates a high level of noise in the detector design which provides a detection limit substantially higher than the thermal noise level of the input signals and in the input signal shaping. The use of a single comparator rather than two and the logic gate significantly reduces parts count and power requirements while inherently providing superior performance, an example circuit for which is illustrated in FIG. 17.

One embodiment of the operation of the single comparator circuit is described here. When there is no input signal, the comparator negative input is at zero plus the noise level. The comparator output is high, or if not, will rapidly switch high to the output. When the output is high, the current in Q1 and Q2 is balanced, so that the threshold input current for the input voltage divider and therefore R providing a threshold voltage R*I. Thus, this state is maintained until the voltage at the inverting input exceeds this value. At that point, the comparator output will transition low, at the output and provide a current in $R_f$, that shuts off Q1, eliminating the current in R providing a strong positive feedback. The voltage at R will rapidly go to zero volts, so that the threshold for the zero-crossing transistor is precisely at zero volts, providing the precise timing for the event. At this transition, the reference offset at the plus input is returned to the threshold level, such that the comparator system is prepared for the next event that exceeds threshold.

This operation is significantly faster than the operation of the standard CFD, where the zero-crossing detector provides the timing clock pulse to a flip-flop that has been enabled by the threshold detector to transition at the timing pulse. The flip-flop then remains high until it is either reset, or the timing comparator again is triggered on noise. Where a well-defined output pulse is required, the flip-flop may be configured to prevent additional triggers and/or to prevent early resets until a timing period has elapsed. This typically requires another series logic gate that adds more delays and variation with time, temperature, and supply voltage.

It is a challenge to have timing accuracy less than 1 ns, if the variations of typical high-speed CMOS may be from 4 to 10 ns propagation across devices, which may vary depending upon supply voltage, temperature, and aging. Implementation of emitter coupled logic can significantly improve timing accuracy, but at the cost of a much lower level of noise immunity (in terms of voltage magnitude) and a significantly more complex and challenging power, signal, and level conversion to other processing logic. Embodiments of the present disclosure eliminate these issues by requiring a simple comparator. In data collected with input events having an input dynamic range of over 40 dB (100:1), the timing variation is less than 25 ps, or the time it takes light or other EM photo to travel 1 inch in free air.

In the case of a timing application with a "start" and "stop" unit used together on a common power source, this would provide a timing resolution better than 190 ps over the full dynamic range at each or either input. Since the power supply voltage and temperature of the circuits would track each other, any variations in propagation delays would be similar in both, and therefore cancel in the difference. The result is the elimination or substantial reduction in the resulting time measurement. Where multiple devices are required in the conventional CFD, this would not be the case, as the temperature behavior varies as a function of a particular piece of silicon for both temperature and supply voltage characteristics, and while some tracking will occur, is typically a reduction by a factor of 10, so with a typical AC device which varies from 4 to 10 ns, this would be a variation of 1/10 of that, or 600 ps per device or potentially 1.2 ns between two, or nearly an order of magnitude greater.

Thus, the embodiments of the disclosure provide a substantial improvement over a conventional CFD by: reducing the complexity, reducing power requirements, eliminating a main source of noise, providing a large increase in dynamic range of operation, providing the ability to match input signal characteristics without changing components, providing simple trim to match propagation times across multiple units, and permitting use of CMOS and other "standard" devices (comparator) rather than more challenging or other very high speed differential devices.

In one embodiment, the system operates from positive and negative 5 volt power requiring about 30 mW. The input signal is a pulse signal, with an adjustment range to support rise times from 5-8 to 100 ns with setting a single potentiometer on the board. It provides a low-level comparator for comparator input low level charge walk, as well as a threshold adjustment range from 0 to 250 mV with an external line for either fixed, manually adjusted, or computer controlled (DAC).

The output is a standard TTL/CMOS output that is normally high. The signal transitions low when the input exceeds the detection threshold and the following transition high is a precise event time. In one embodiment, with a precision ToF system, such that the combined result permits precision timing with low cost, low power conventional logic with a timing precision well below 1 nanosecond. For such a combined system with a maximum timing range of 150 nanoseconds and RMS timing variation of less than 50 ps has been measured or less than 333 ppm of full scale. The linearity of the measurements is to better than 0.1%.

In one embodiment, the input filter has an impedance of constant magnitude, but the phase varies in the frequency region associated with the phase transition, or $\sim 1/(2\pi RC)$. As a result, it should be driven from a voltage source in low impedance source that is constant in that frequency region to avoid timing variations.

Selection of the filter amplifier in terms of frequency bandwidth is similar as for any operational amplifier. To reduce variations in performance over frequency to less than 5% the closed loop amplifier bandwidth should be at least three times the highest frequency of the input signal to be processed.

For example, if the input signal to the CFD has a rise time of ~70 MHz to minimize any increase in that rise time to less than 5% would require the filter amplifier bandwidth to be at least 210 MHz. Thus, most voltage feedback amplifiers would not be suitable for the application. However, amplifiers of the current feedback configuration would work nicely. In the schematic shown in FIG. 17, for example, an AD8014 CFB amplifier is used, which has a nominal bandwidth of over 250 MHz at a gain of 2. Thus, the AD8014 CFB amplifier is well suited for signals with rise time to this level. However, if the input signal rise time is faster (2.5 ns) then the associated bandwidth required is doubled, and greater than that of the amplifier.

One potential issue that may have an impact on the filter operation is the slew rate capability of the amplifier. This results in an effective change in the frequency response of the amplifier with increasing signal amplitude. For a sine wave, the slew rate is related to amplitude and bandwidth as slew=$2\pi fV$. In a system with ±5 V rails, the typical peak swing is to ~3 volts. Thus, with an input signal with a 5 ns rise time, or peak frequency of ~70 MHz, the required minimum slew rate is $1.32 \times 10^9$ volts per second, or ~1,319 volts per microsecond. As noted before, this is far above what most voltage feedback amplifiers can provide, and for good performance, it is desirable to have a significant margin. Again, this is an area where current feedback amplifiers shine. In the case of the AD8014 CFB amplifier, the device slew rates are specified as 2,500 to 4,600 volts per microsecond. While good, it is at the 3:1 limit for minimal effect.

Feedback amplifier theory helps to explain how variation affects the performance of the amplifier. For a single pole system, the phase shift component (ignoring the amplitude variation) can be thought of as a time delay equal to the characteristic $\tau$ or $\frac{1}{2\pi f}$. For a feedback amplifier, at the unity gain crossover, it must look like a single pole system to be stable. Thus, there will be no change in the zero-crossing time so long as the bandwidth is constant. However, the time of the zero crossing will shift directly in proportion to the change in frequency response. Thus, when the amplifier bandwidth is reduced due to the slew rate limitation, the zero crossing will shift as well. A consequence of this is a timing variation of the CFD at large amplitude signals, such that it is critically important that the filter bandwidth remain constant.

One embodiment of the disclosure comprises passively filtering the input to the CFD to a slower rise time to within the slew rate limitation of the filter amplitude, such that there will be little or no change in the timing performance.

Precision Time of Flight Measurement

Some embodiments include a precision time of flight module. The precision time of flight module provides advantages over prior systems in that it reduces complexity and has eliminated issues that limited high accuracy and stability of the readout. The precision time of flight module provides balanced and compensated operation and provides finer time resolution, accuracy, and stability, with a low parts count resulting in very low power requirements. For example, a timing FWHM timing resolution/stability of on the order of 60 ps can be achieved on a unit with a 150 ns measurement range.

The precision time of flight system is configured to provide extremely high and consistent timing precision with very low power requirements. This enables the small system size and low power essential for a portable, battery powered system. The improved time of flight system can be used in a wide array of applications including, for example, terrestrial and space applications where substantially more complex and fragile approaches are currently required.

One embodiment of a solution to measure timing with resolution of 1 ns or less involves using various gates and switches with an analog signal to provide a known slew rate to a capacitor and measuring a change in voltage. Some potential issues include precision switching on and off of current, holding a value after the event long enough to measure, thermal variations affecting accuracy of change rate, switch leakage, and injection charge due to switch operation.

Another embodiment of a solution to measure timing with resolution of 1 ns or less involves using clock frequencies with a digital signal. Some potential issues include using a required clock frequency, where 1 ns represents 1 GHz clock, inherent parasitic capacitance, propagation delays. Approaches to deal with these issues involve PLL (phase lock loops), DLL (delay lock loops), and other perturbations that essentially provide a digital Vernier to have an array of slightly differing phase known frequency signals to provide extended timing accuracies much finer than base frequencies. Other potential issues include complexity, power requirements, precision clock and oscillator alignment, so such solutions are implemented on an FPGA, or dedicated (and therefore inflexible) silicon solution, such as ASIC for example.

A proposed solution implemented in one embodiment of the system described herein includes a novel analog approach using a minimal parts count approach that is inherently thermally and aging stable, while requiring conventional and easily available parts, and using low power requirement. The accuracy and repeatability is limited by the stability of only a couple of parts while providing an exceptionally long hold time to convert the analog voltage representation as required.

The approach uses a single high-speed logic FF on a single piece of silicon (a 74AC74 or 54AC74 or equivalent) to drive a precision integrator implemented with a CMOS or FET front end.

The use of the single piece of silicon FF means that the device propagation delays and variations with voltage, temperature, and time all vary identically, such that in the differential measurement of the start and stop input they cancel out, leaving only the time difference between the inputs.

Figure 22:
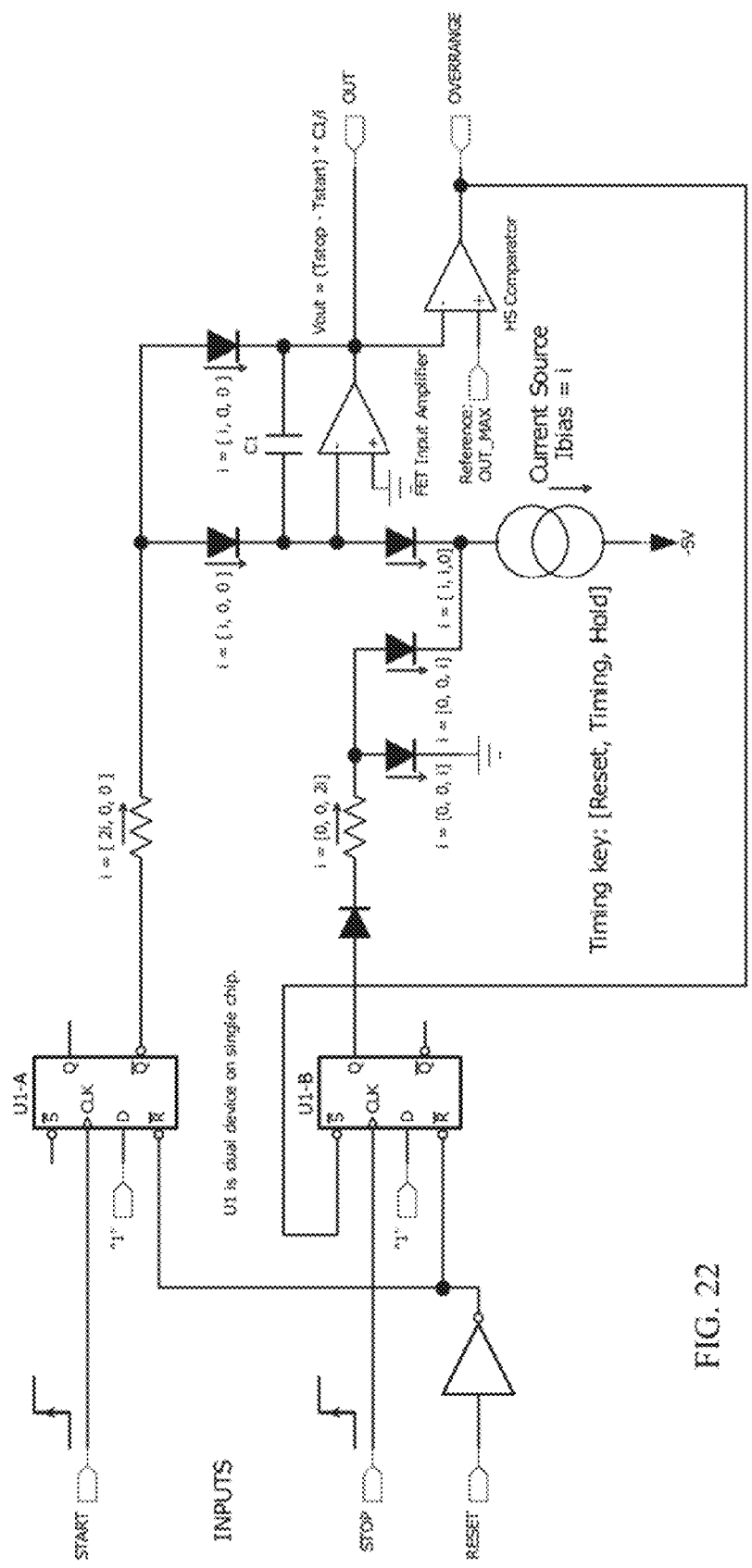
FIG. 22 is an example analog processing circuit for making improvements in time of flight, in one embodiment of the disclosure.
Figure 23:
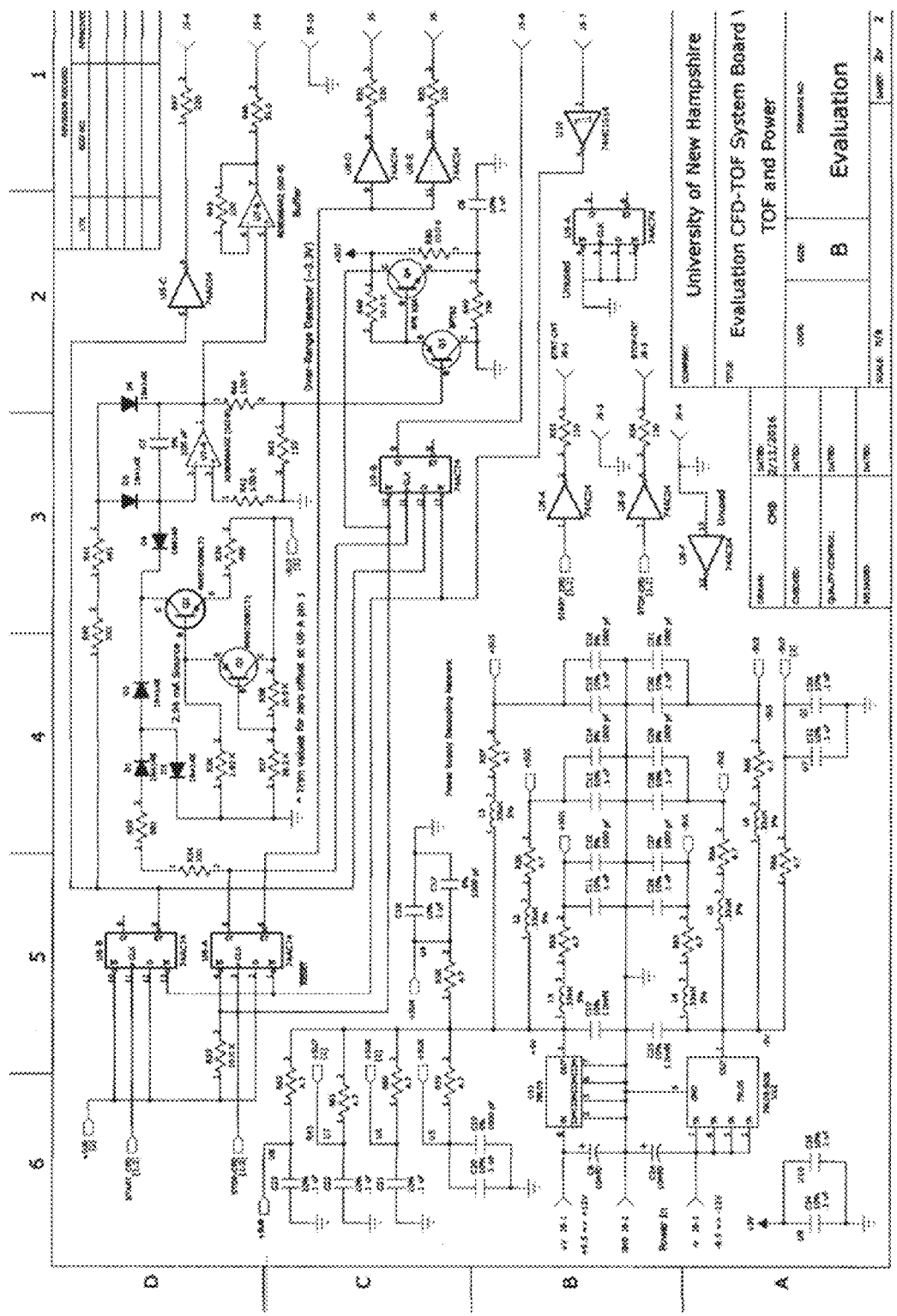
FIG. 23 is a schematic of a CFD-ToF system board, in one embodiment of the disclosure.

An example analog processing circuit is illustrated in FIG. 22 and uses identical paths with identical currents to balance out any variations in the analog conversion of time to voltage. Once the measurement is made, it is held in a similar manner, with leakage currents balanced as well, minimizing or eliminating droop in an extended time to do ADC conversion or other processing.

Constant Fraction Discriminator—Time of Flight (CFD-ToF) Board

In some embodiments, the constant fraction discriminator described above is configured to provide input signal conditioning which enables the time of flight to be measured even more precisely.

Figure 10:
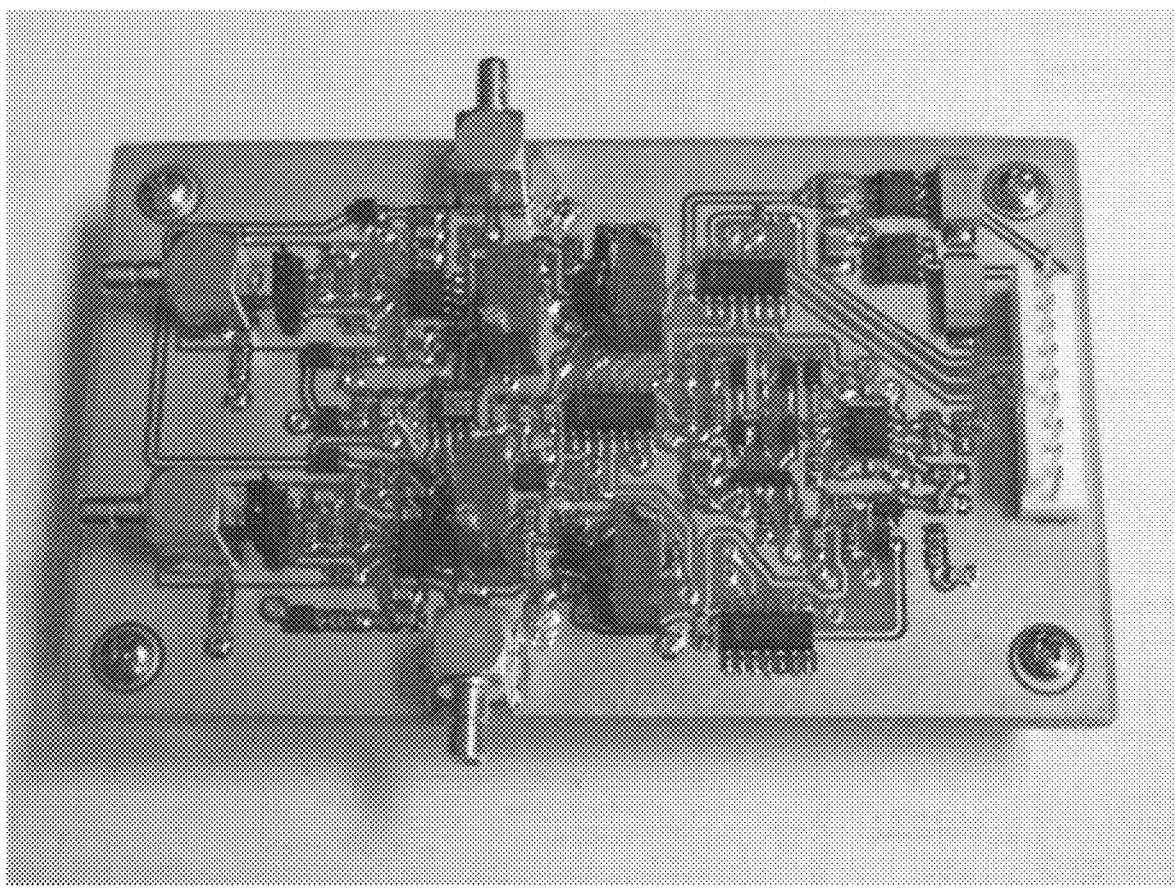
FIG. 10 is an image, of a board design for a constant fraction discriminator (CFD) time of flight (ToF) board.

The CFD-ToF board, as shown in FIG. 10, provides one embodiment of signal processing for low level input signals from two sources, and measures the time difference between them as a scaled output voltage. It processes signals from low level, high speed sources such as a multi-channel plate (MCP) and similar detectors. A micro-channel plate is a type of high resolution photon or particle detector that can provide location information as well as energy. A micro-channel plate can detect single events and localize them in a compact package, useful for imaging and measurement. Characteristics of MCPs include high gain, resolution, compact size and resistance to distortion from magnetic and electric fields, which make them a good choice for gamma ray and particle imaging applications. MCP manufacturers include Photonis or now Burle Electro-optics and Hamamatsu Corporation.

An MCP has very high gain, and can detect single photons or electrons with gains between 106 and 107. Typical output pulses have widths of a few 10's of nanoseconds. The resulting output typically has a current of about 80 uA for 20 nS at an MCP gain of 107, with a rise time of 2 nS or less.

The resulting signal has a frequency bandwidth extending from less than 10 MHz to well over 350 MHz. This requires a carefully controlled transmission line environment to process, with a typical characteristic impedance of 50 ohms to prevent distortions to the inherent parasitic inductance and capacity of any physical object. A current of 80 uA applied to a 50 ohm transmission line results in a maximum pulse amplitude of ~4 mV for a cable terminated only at the far end, or ~2 mV if terminated at both source and load ends.

At the same time, noise from a good amplifier with a 350 MHz bandwidth is about 70 uV RMS, or about 0.4 mV peak to peak. Consequently, this board uses very high bandwidth, high gain amplifiers to amplify the signal by a factor of 30 to provide signals of 40 to 80 mV. This amplified output is provided as an auxiliary output for other processing, although reduced by a factor of two if terminated in 50 ohms. This is processed by a novel CFD design to eliminate timing variations with input signal amplitude variations. This circuit operates by comparing a delayed and inverted signal to the input signal to provide a zero-crossing output independent of the input amplitude once it is above a minimum threshold. This eliminates amplitude-dependent timing variations inherent to simple threshold detection.

The implementation developed and applied in this design provides easily adjusted broad range of rise time compensation as well as the usual threshold and low-level walk adjustment with a very low parts count that minimizes power requirements and parasitic effects because of the compact resulting layout.

Figure 11:
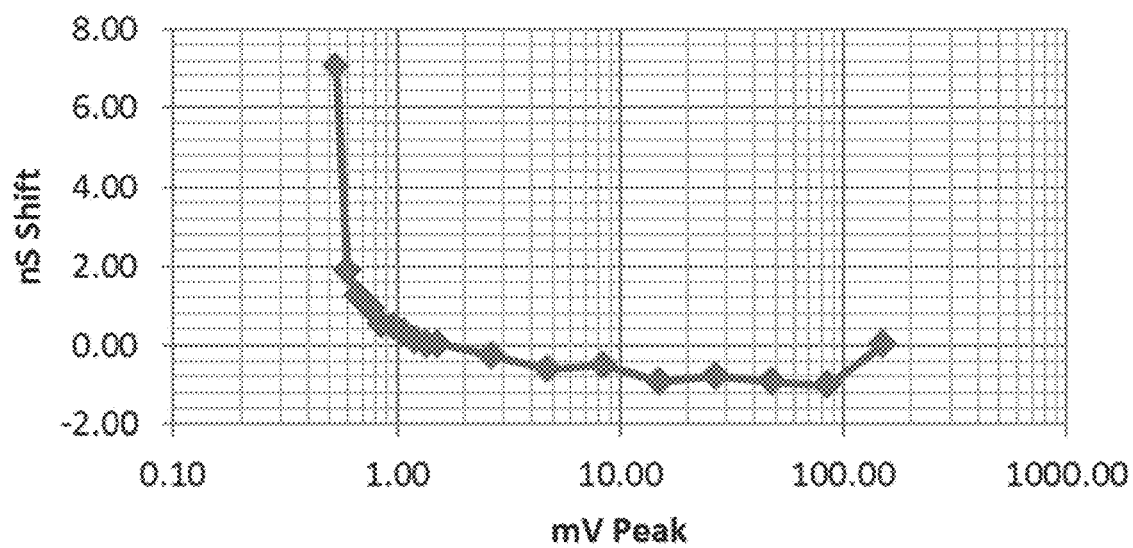
FIG. 11 is a graph of walk variation with amplitude with a source signal with a 5 ns rise time.

However, as with all CFD designs, it cannot eliminate all timing variations due to event to event rise time differences, but does reduce the variations to substantially less than half the rise time variation. FIG. 11 illustrates a graphical representation of walk variation with amplitude, with a source signal with a 5 nS rise time. The mV peak scale is logarithmic.

The two input signals from the MCP's are processed by two identical amplifier and CFD channels, and then latched by standard "D" latches in CMOS 74AC logic. Both latches are on a single integrated circuit device that assures inherent variations due to temperature, aging, and layout between devices are matched and minimized, and cancel out in the subsequent conversion of time to voltage. The latched outputs drive a novel and simple current source driven integrator, configured such that gating control transients, voltage offsets, and leakage currents all cancel over temperature and time. The resulting integrated current on an isolated capacitor provides extremely linear and accurate measurements of the time difference between the "start" and "stop" input latched events. Accurately balanced control and reset currents result in a zero-leakage current to the integrator and capacitor such that the "droop" in the held voltage measurement is extremely small, essentially that of the integrator amplifier bias current. A high-performance J-FET amplifier used for this, with current in the pico-ampere range, resulting in long, accurate hold times for processing.

The TOF scale factor can be set over a wide range from less than 50 nS full scale to over 1 mS full scale by changing only a single capacitor in the integrator, maintaining the very high repeatability and linearity, as seen below with a full-scale measurement range of 150 nS at 3.0 volts out.

Figure 13:
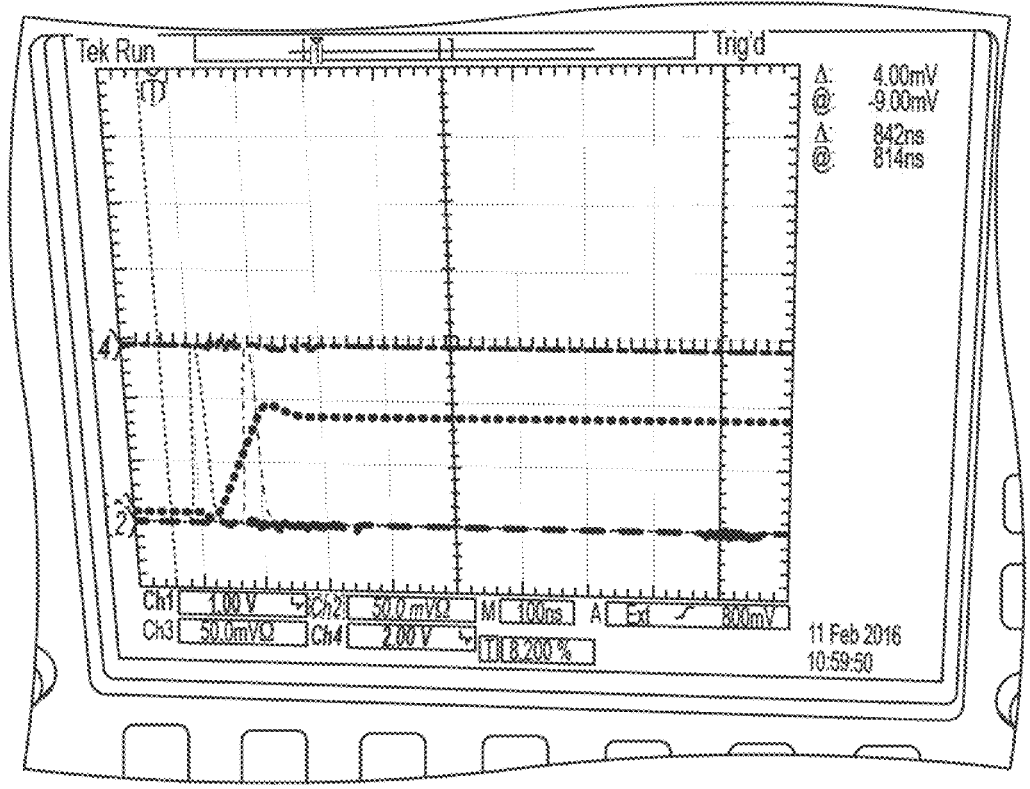
FIG. 13 is an oscilloscope display showing a start and stop signal and the ToF output.

After the processing is completed, the system is reset to enable processing the next event. "Start" or "stop" events occurring after the first are ignored until the system is reset, although separate outputs are provided to enable counting of the total CFD triggers to the system. The resulting operation is very fast, with the ToF measurement available within 100 nS of the "stop" event. This delay is due to settling time for the integrator as can be seen in FIG. 13 which illustrates an oscilloscope trace of typical signal operations. The blue and red traces are the "start" and "stop" signals respectively, and the yellow trace is the ToF output. The settling time is visible as the small overshoot on the ToF output.

Figure 12:
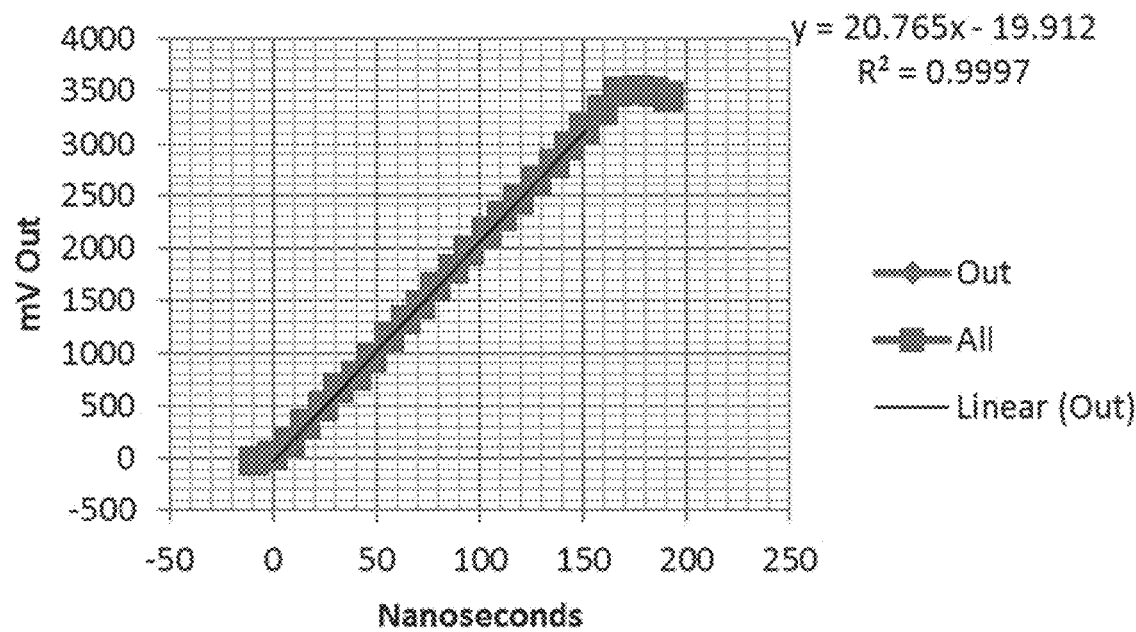
FIG. 12 is a graph of voltage output versus time illustrating a ToF scale factor.

With a scale factor of 50 nS/volt, or 150 nS full scale, the event to event 1 sigma timing variation is measured at 25×10-12 seconds, with a linearity of better titan 0.1% over a range of 0 to 150 nS, as seen on the plot in FIG. 12.

Figure 14:
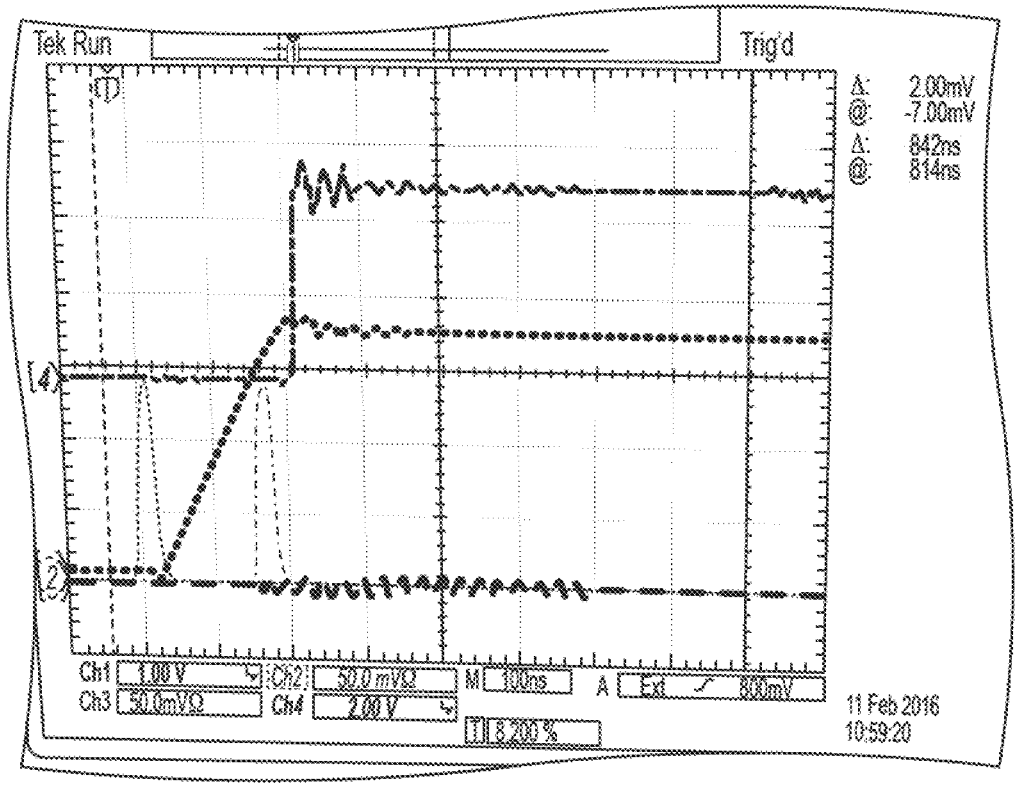
FIG. 14 is an oscilloscope display showing a stop with no associated start, as shown by green line, in which case a "fail" output is asserted.

Other features of this design include trigger events for the total number of "start" and "stop" events over the CFD threshold, providing a count of events including those that were locked out during the processing time of an event. There is a "fail" output asserted if there is a "start" event and no "stop" within the measurement window, about 120% of full scale, or if there is a "stop" and no associated "start." This is seen as the green line in the oscilloscope trace FIG. 14.

Other available outputs include the latched "start" and "stop" event lines, with the "stop" latched line serving as an EVENT out line, set when a measurement is completed whether successful or due to a measurement failure.

Due to the simple, low parts count design, the overall power requirement is low, less than 1.2 watts. The majority of the power is due to the input amplifiers and CFD, with less than 0.150 watt required by the ToF portion of the system. As a result, it should be less power overall for this type of performance than other approaches including digital approaches, since other approaches would still require the amplifier and CFD processing. The power requirements could significantly decrease depending upon the required input amplifier performance.

Energy/PSD Measurement System

In various measurement systems, it is desirable to measure the shape of an incident signal. Conventional approaches to pulse shape discrimination (PSD) are only marginally functional with a single SiPMT, much less with large arrays.

The energy/PSD measurement system described herein not only performs as well as conventional systems with conventional detectors, but exceeds the performance, despite having a much smaller footprint. The improved energy/PSD measurement system can be used in a wide array of applications including, for example, as a low cost, low atomic weight spectrometer for terrestrial and space applications where substantially more complex and fragile approaches are currently required.

Pulse shape measurement with a class of scintillator materials as stilbene and other plastic materials permit identifying the nature of the event as a gamma ray (a photon event) or a neutron or other heavy particle. The difference is a few percent of a short pulse with duration of a few tens to about 100 ns. In particular, with suitable accuracy and resolution achieved, it may be possible to do mass spectrometry without extensive hardware but there are numerous approaches to accomplish this. In one embodiment, an approach includes differential integrations, complex slope filtering, and high-speed total event digitization and analysis and FFT analysis. Achieving successful measurements at low energy levels is not easily achieved. In one embodiment, using a portion of the total signal allows for performance improvements.

One embodiment of the disclosure includes a less complex approach to measure energy and pulse shape. All the event energy may be used to provide successful identification at levels close to the detector detection limit. This approach provides a number of measurements of the detected event, including the peak amplitude, integrated energy, and PSD. This approach uses provides a wide dynamic range of successful detection including low noise measurements to only a few times the signal detection limit. The mode of detection eliminates rise time and cable termination sensitivity that may provide challenges in commercial units.

One embodiment is implemented as a plug-in module that is configured to produce performance results equal or better than approaches using detectors that are fragile and/or more complex.

The performance results obtained have been tested and confirmed with detector systems that extend over most of the dynamic detection range. When the total collected photons from the scintillator material have an inherent spread lower than that of the difference, about 20%, of differing types of events is no longer reliable. If the total number of collected photons is less than 25, for example, discrimination is no longer possible regardless of the approach. In prior systems, only about 40% of the total photons are used to make the discrimination so that the minimum reliable detection limit is on the order of 64 photons or more.

Example results of the improved energy/PSD measurement system using multiple modules are illustrated in FIG. 18. In FIG. 18, an overlay of measurements from 18 different detector arrays is graphically illustrated. FIG. 18 further illustrates that much of the variation with event energy is eliminated and that improvements have been made in dynamic range.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A system for imaging and measuring neutrons and gamma rays, the system comprising:
    two or more detector layer cases;
    a plurality of plates, having at least a first plate and a second plate, the first plate comprising pulse-shape discriminating detectors and the second plate comprising non-pulse shape discriminating detectors, which plates are parallel to each other and configured in a stacked arrangement; and
    an electronic and processing unit;
    wherein the first plate and the second plate each carry a plurality of scintillation detectors;
    wherein the first plate and the second plate are contained within the two or more detector layer cases; and
    wherein the system is portable.

2. The system of claim 1, wherein each of the first plate and the second plate are contained within one of the two or more detector layer cases and wherein the plurality of scintillation detectors are electronically connected to the electronic and processing unit.

3. The system of claim 1, wherein the plurality of scintillation detectors detect a neutron and/or a gamma ray and the electronic and processing unit determines the path of the neutron and/or gamma ray based on an interaction with one of the plurality of scintillation detectors on the first plate and an interaction with one of the plurality of scintillation detectors on the second plate.

4. The system of claim 1, wherein the plurality of scintillation detectors are formed from stilbene.

5. The system of claim 1, wherein the plurality of scintillation detectors are a combination of non-pulse shape discrimination organic scintillators, inorganic scintillators, and scintillators that possess pulse shape discrimination properties.

6. The system of claim 4, wherein the scintillators that possess PSD properties use stilbene, the inorganic scintillators use NaI, the non-PSD organic scintillators are plastic.

7. The system of claim 1, wherein the system is configured to localize sources of MeV neutrons and gamma rays within ±3°.

8. The system of claim 1, wherein the system is configured to localize sources of MeV neutrons and gamma rays with an angular resolution of about 15°.

9. The system of claim 1, wherein the system is configured to use greater than 20 intersecting cones to localize sources of MeV neutrons and gamma rays.

10. The system of claim 1, wherein the system is configured to operate with voltages below 35 volts.

11. The system of claim 1, wherein the plurality of scintillation detectors are configured for detection of neutrons in the energy range of between about 1 MeV to about 20 MeV.

12. The system of claim 1, wherein the plurality of scintillation detectors are configured for detection of gamma rays of between about 0.3 MeV and about 10 MeV.

13. The system of claim 1, wherein the plurality of scintillation detectors are arranged in a matrix configuration.

14. A kit of parts for detecting neutrons and gamma rays comprising: two or more portable cases;
    a plurality of plates, having at least a first plate and a second plate, wherein the first plate and the second plate each carry a plurality of scintillation detectors, the first plate comprising pulse-shape discriminating detectors and the second plate comprising non-pulse shape discriminating detectors, which plates are parallel to each other and configured in a stacked arrangement;
    at least one camera; an electronic and processing unit; and
    a remote computer, the remote computer comprising a display panel for displaying detection results.

15. The kit of parts of claim 14, wherein the scintillation detectors include non-PSD organic scintillation detectors, inorganic scintillation detectors, and scintillation detectors that possess PSD properties.

16. The kit of parts of claim 14, wherein a signal to noise ratio is maximized for detection of a neutron or a gamma ray based on a pulse shape measurement.

17. A method of imaging and measuring neutrons and gamma rays comprising:
   providing an electronic and processing unit;
   providing a plurality of scintillation detectors of uniform length and width that are distributed in a matrix, the plurality of plates being held within two or more portable, field deployable cases, wherein the detectors are electronically connected to the electronic and processing unit, wherein the plurality of scintillation detectors comprise non-PSD organic scintillators, inorganic scintillators and scintillators that possess PSD properties;
   detecting a particle by its interaction with the non-PSD organic scintillators;
   measuring the time of flight of the particle from the non-PSD scintillators to the scintillators that possess PSD properties;
   determining details regarding the particle based on interaction of the particle with the scintillators that possess PSD properties, including a pulse shape measurement generated by pulse-shape-discrimination (PSD) property of the scintillators;
   detecting the particle by its interaction with the inorganic scintillators; and
   analyzing data to determine if the particle is a neutron or a gamma ray.

18. The method of claim 17, wherein a signal to noise ratio is maximized for detection of either the neutron or the gamma ray based on the pulse shape measurement.

19. The method of claim 17, wherein the inorganic scintillators use NaI, the non-PSD organic scintillators are plastic, and the scintillators that possess PSD properties use stilbene.

20. The method of claim 17, wherein the non-PSD organic scintillators, the inorganic scintillators and the scintillators that possess PSD properties are grouped in trios.

* * * * *